US010780943B2

(12) United States Patent
Denninger et al.

(10) Patent No.: US 10,780,943 B2
(45) Date of Patent: Sep. 22, 2020

(54) HUMAN-HYBRID POWERTRAIN FOR A VEHICLE OR MOVING EQUIPMENT USING MAGNETORHEOLOGICAL FLUID CLUTCH APPARATUS

(71) Applicant: EXONETIK INC., Sherbrooke (CA)

(72) Inventors: Marc Denninger, Sherbrooke (CA); Guifre Julio, Sherbrooke (CA); Jean-Sebastien Plante, Sherbrooke (CA); Pascal Larose, Sherbrooke (CA)

(73) Assignee: EXONETIK INC., Sherbrooke (CA)

( * ) Notice: Subject to any disclaimer, the term of this patent is extended or adjusted under 35 U.S.C. 154(b) by 0 days.

(21) Appl. No.: 15/776,611

(22) PCT Filed: Nov. 16, 2016

(86) PCT No.: PCT/CA2016/051338
§ 371 (c)(1),
(2) Date: May 16, 2018

(87) PCT Pub. No.: WO2017/083970
PCT Pub. Date: May 26, 2017

(65) Prior Publication Data
US 2018/0370591 A1 Dec. 27, 2018

Related U.S. Application Data

(60) Provisional application No. 62/255,839, filed on Nov. 16, 2015, provisional application No. 62/358,216, (Continued)

(51) Int. Cl.
*B62M 6/55* (2010.01)
*B62M 6/45* (2010.01)
(Continued)

(52) U.S. Cl.
CPC .............. *B62M 6/55* (2013.01); *B60K 1/00* (2013.01); *B60K 7/00* (2013.01); *B62B 5/00* (2013.01);
(Continued)

(58) Field of Classification Search
CPC .......................... F16D 29/00; E05Y 2900/531
See application file for complete search history.

(56) References Cited

U.S. PATENT DOCUMENTS 3,136,537 A 6/1964 Whitfield
6,125,583 A * 10/2000 Murray .................. E05B 81/20
49/291
(Continued)

FOREIGN PATENT DOCUMENTS

DE 19618834 A1 11/1996
DE 102004023120 12/2005
(Continued)

*Primary Examiner* — Brian L Swenson
(74) *Attorney, Agent, or Firm* — Norton Rose Fulbright Canada LLP

(57) ABSTRACT

A system for assisting a user in moving a device relative to a structure comprises a magnetorheological (MR) fluid actuator unit including at least one torque source and at least one MR fluid clutch apparatus having an input coupled to the at least one torque source to receive torque from the at least one torque source, the MR fluid clutch apparatus controllable to transmit a variable amount of assistance force via an output thereof. An interface is configured for coupling the output of the at least one MR fluid clutch apparatus to the device or surrounding structure. At least one sensor provides information about a movement of the device. A processor unit for controlling the at least one MR fluid clutch apparatus in exerting the variable amount of assistance force as a function of said information, wherein the system is configured for one of the MR fluid actuator unit and the interface to be coupled to the structure, and for the other of the MR
(Continued)

fluid actuator unit and the interface to be coupled to the device for the assistance force from the MR fluid actuator unit to assist in moving the device.

15 Claims, 25 Drawing Sheets

Related U.S. Application Data filed on Jul. 5, 2016, provisional application No. 62/367,186, filed on Jul. 27, 2016.

(51) Int. Cl.

| | | |
|---|---|---|
| *B62M 19/00* | (2006.01) | |
| *F16D 37/02* | (2006.01) | |
| *E05F 15/60* | (2015.01) | |
| *E05F 15/627* | (2015.01) | |
| *F16D 29/00* | (2006.01) | |
| *B62B 5/00* | (2006.01) | |
| *B60K 1/00* | (2006.01) | |
| *B62M 11/14* | (2006.01) | |
| *B60K 7/00* | (2006.01) | |
| *F16D 37/00* | (2006.01) | |
| *F16H 19/06* | (2006.01) | |
| *E05F 15/611* | (2015.01) | |
| *F16H 1/16* | (2006.01) | |

(52) U.S. Cl.
CPC ............ *B62M 6/45* (2013.01); *B62M 11/145* (2013.01); *B62M 19/00* (2013.01); *E05F 15/60* (2015.01); *E05F 15/627* (2015.01); *F16D 29/00* (2013.01); *F16D 37/008* (2013.01); *F16D 37/02* (2013.01); *F16H 19/06* (2013.01); *E05F 15/611* (2015.01); *E05Y 2201/216* (2013.01); *E05Y 2201/258* (2013.01); *E05Y 2800/113* (2013.01); *E05Y 2900/106* (2013.01); *E05Y 2900/30* (2013.01); *E05Y 2900/50* (2013.01); *E05Y 2900/531* (2013.01); *E05Y 2900/544* (2013.01); *E05Y 2900/546* (2013.01); *F16H 1/16* (2013.01); *F16H 2019/0695* (2013.01)

(56) References Cited

U.S. PATENT DOCUMENTS

| | | | |
|---|---|---|---|
| 6,318,531 B1 * | 11/2001 | Usoro | F16D 37/008 |
| | | | 192/21.5 |
| 8,157,689 B2 * | 4/2012 | Steinwender | E05D 11/082 |
| | | | 475/154 |
| 10,480,594 B2 * | 11/2019 | Plante | F16D 37/02 |
| 2003/0136626 A1 | 7/2003 | Ciaramitaro et al. | |
| 2005/0274557 A1 * | 12/2005 | Barta | B62D 33/0608 |
| | | | 180/89.15 |
| 2010/0107502 A1 * | 5/2010 | Okada | F16D 37/008 |
| | | | 49/349 |
| 2013/0098187 A1 | 4/2013 | Pittini et al. | |
| 2016/0032624 A1 | 2/2016 | Bendel et al. | |
| 2017/0247927 A1 * | 8/2017 | Elie | E05F 15/60 |
| 2018/0072189 A1 * | 3/2018 | Plante | B60G 99/002 |
| 2018/0202212 A1 * | 7/2018 | Xiao | E05F 3/00 |
| 2018/0216384 A1 * | 8/2018 | Rietdijk | E05F 3/16 |
| 2018/0216392 A1 * | 8/2018 | Rietdijk | E05F 15/627 |
| 2019/0352954 A1 * | 11/2019 | Salter | E05B 81/77 |

FOREIGN PATENT DOCUMENTS

| | | |
|---|---|---|
| DE | 202008015420 | 3/2009 |
| WO | 2005111354 A1 | 11/2005 |

* cited by examiner

HUMAN-HYBRID POWERTRAIN FOR A VEHICLE OR MOVING EQUIPMENT USING MAGNETORHEOLOGICAL FLUID CLUTCH APPARATUS

CROSS-REFERENCE TO RELATED APPLICATION

The present application claims the priorities of U.S. Patent Application No. 62/255,839, filed on Nov. 16, 2015, of U.S. Patent Application No. 62/358,216, filed on Jul. 5, 2016, and of U.S. Patent Application No. 62/367,186, filed on Jul. 27, 2016, the contents of all three being incorporated herein by reference.

TECHNICAL FIELD

The present application generally relates to the field of human-hybrid vehicles or equipment propulsion systems, and more particularly, to a human-hybrid vehicle or equipment propulsion systems using magnetorheological (MR) fluid clutch apparatuses.

BACKGROUND OF THE ART

The use of human-hybrid powertrains on many vehicles and equipment is desirable for propulsion or traction since such arrangement assists the human user through a physical effort. In order to reduce the amount of human effort required to propel the vehicle or move equipment, various types of human-hybrid vehicles or equipment have been introduced over the years. In many cases, the user can maintain the speed of the vehicle or equipment by consuming energy coming from fuel or batteries, for example. On inclined surfaces, the consumption of energy required to maintain movement may increase dramatically since energy is required to fight against gravity. An increase in energy consumption may also be observed on a flat or inclined terrain in the presence of air movement, such as headwind.

The human body can produce a sustained effort over a long period of time if maintained in the proper operating zone. The case of sprinters versus marathon runners illustrates that very well. The sprinters can run very fast for a short period of time in an anaerobic effort, then need rest to recuperate. To the contrary, marathon runners can run at a decent sustainable pace for a long period by remaining in aerobic effort. The optimal performance for a given longer distance is often obtained while covering it at a regular rhythm or body activity level, i.e., in aerobic effort.

Human-hybrid type powertrains generally employ an internal combustion engine or a motor/generator unit that operate in concert with human power to provide driving power to the wheels of a vehicle or equipment. The internal combustion engine or electric drive capability of the vehicle is generally used where the human effort needs to be augmented or replaced because the human power is not enough to reach the desired performance or range. This type of vehicle or equipment is suited, by way of example, to maximise the range the human can go in the vehicle or equipment or to allow him/her to reach a distance otherwise unattainable without the sole contribution of human power or energy. Human-hybrid powertrains are not limited to using internal combustion engines or electric motors used in combination with human power but can also use an inertia wheel, air pressure turbine or other any other power source. It can also be composed of more than one additional power source combined with the human power. In general, for the purpose of simplifying the text, any power source other than human will be named additional power source.

Vehicles employing a human-hybrid powertrain are well suited for urban transportation where a significant amount of stop and go driving is undertaken. Some of these vehicles can also include regenerative braking to recharge the electrical power storage devices (batteries), to store energy in a flywheel or to pressurise a fluid in a reservoir, only to name a few examples. During urban travel, the powertrain takes advantage of both the human power and the additional power source to improve, as an example, performance and range. The human-hybrid powertrain may also allow the shutdown of an internal combustion engine at vehicle stops.

Human-hybrid powertrains are also suited for off road transportation where the additional power source can be utilized to assist the human in driving the vehicle during high-power output conditions such as rapid acceleration and hill climbing. The additional power source may also provide propulsion in the event that the human power is inadvertently discontinued because of lack of energy or force, for example.

Some conventional human-hybrid powertrains may include gearing or clutch systems designed to effectively combine the assistance of the additional power source to the human effort in order to get an integrated system. In simple human-hybrid systems, the additional power source is controlled by the human action on controls, whereas in more evolved human-hybrid powertrains, the additional power source may be controlled by a controller using data collected from sensors. In some human-hybrid powertrains, the controller may control the power output of the additional power source as a function of the user needs or desires.

A good example of a human hybrid powertrain is known to be the moped. A moped is a small motorcycle, generally having less stringent licensing requirements than motorcycles, or automobiles, because mopeds typically travel about the same speed as bicycles on public roadways. Strictly speaking, mopeds are driven by both an internal combustion engine and by bicycle pedals. On a moped, there is usually a single ratio between the pedal and the wheel. On most mopeds, the pedals may become difficult to use once the vehicle has reached a certain speed because it is difficult to match the speed of the wheel with that of the pedals, the pedalling cadence being too high. In order to compensate for this occurrence, mopeds with multiple speed ratios between the pedals and the wheel have been introduced. In spite of this, because of the non-linear power and torque curve typical of internal combustion engines, it may be a challenge to have a moped engine that works seamlessly with human power. One approach would have the power coming from the engine proportionally to the power provided by the human but one problem in implementing this approach is that the torque coming from the internal combustion engine may be low at low speed. In order to patch this behaviour, a centrifugal slipping clutch may occasionally be added in order to couple the internal engine/transmission to the human power. The centrifugal clutch may be not easily controllable as the engagement is dependent on the speed of rotation of the motor. As additional device, a one-way clutch may be used in order to allow the internal combustion engine to overtake the speed of human power actuation while not dragging the mechanism that is in contact with the human. This one-way clutch is usually engaging or disengaging without a smooth transition. Internal combustion engine may also be difficult to control in torque and have relatively slow answer, low bandwidth, compared to other power source like electrical motors, for example.

Other types of moped are driven by electrical motors. Electrical motors are easier to control because they may have higher bandwidths than internal combustion engine. On an electrical moped where high dynamic response is sought, the most common form of electromechanical actuation is found in direct-drive motors, which are prohibitively heavy. Device weight can be considerably reduced by providing a reduction ratio between the motor and the pedals or the wheel. Indeed, when coupled to reduction gearboxes, electromechanical actuators are much lighter and less expensive than direct drive solutions, but their high output inertia, friction and backlash greatly diminish their dynamic performance. They may not be controlled with the same bandwidth. Similar problems may arise as with the use of internal combustion engines where there are risks that the motor drags the movement of the human. As such, devices like one-way clutches may be required to connect the electrical motor and gearbox combination to the human power in order to ensure safety of the user.

In the examples of the internal combustion engine and electrical mopeds, in order to prevent the pedals from being moved at a faster speed than desired, and associated risk of injuries or discomfort a one-way clutch may be used as explained above. The one-way clutch may be operative every time the user stops turning the pedals while the engine outputs its mechanical power to the wheel, when the bandwidth of the motor speed reducer control does not decelerate the power source to match the user pedaling speed. Such hybrid systems may be not easily controlled due to their low bandwidth and the user will feel engagement and disengagement of the one-way clutch and the engagement and disengagement of the additional power source. Low bandwidth of the powertrain may be caused by the high inertia of rotating parts that are opposing speed change in the system. When the user input speed varies, the high inertia of the system may become perceivable by the user and may cause annoyance. A system with a low bandwidth will not adapt fast enough to the change of the user such that the user may feel connected to a mechanical device. The annoyance may come from the fact that the mechanical system speed is not able to follow the user input speed, creating sticking points or unnatural movement. Hence, if it is desired to apply an assistance proportional to the user applied force to create the illusion of an smoother pedalling for the moped and the system has low bandwidth, the assistance may not adapt rapidly enough and may create a delay in the applied force that will be felt by the user. Usually, the bandwidth of standard powertrains may decrease as the speed of its rotating parts increases, hence their inertia also increase. For that reason, as the speed of rotating parts increases, the powertrain may lose its ability to adapt to the human change.

Other non-vehicle devices or equipment may also have human-hybrid powertrain since they combine human power with the power of an additional source in order to move. A good example of this is an electric pallet jack. In such equipment, a conventional operating mode is that the human pulls on a handle while simultaneously triggering a button in order to have assistance from an electric motor in displacing the jack with load. Generally, the steering of the device or equipment also uses human force but sometimes may also assisted with an additional power source. The control of the electric powered jack may be difficult as the operator may have to jog (on/off) the control in order to get small movements. In heavier equipment in which the motor and gearbox combination is used and where the mechanical bandwidth is low, this is the only option.

Other well known device that may combine human power with the power of an additional source to move is an assisted door. Doors are everywhere, from building to vehicle and types are various. Only to name a few: swing doors, sliding doors, revolving doors, rolling doors. Some of the assisted door may not function well when the power of an additional source is used simultaneously with the human power. In many cases, both power sources are not working together smoothly, sometime even competing each other to have the door to move in a desired direction. This may happen for example when a human is trying to move a door faster than the additional power source is helping. Sometime, human is providing energy not only to move the door but also to have the electric power to accelerate faster when the additional power source is already at its maximum speed or may not react fast enough to the human movement or force change.

SUMMARY

It is an aim of the present disclosure to provide a novel human-hybrid powertrain system that employs MR fluid actuator in order to connect the power of an additional power source with the human power source.

It is also an aim of the present disclosure to present a human-hybrid powertrain having multiple MR fluid actuators selectively connecting a human power source or an additional power source with a multi-speed transmission.

It is further an aim of the present disclosure to present a human-hybrid powertrain having an antagonist MR fluid actuator in order to reduce the induced torque generated by the powertrain to the human.

It is an additional aim of the present disclosure to present a human-hybrid powertrain having multiple MR fluid actuators selectively blocking different stages of a planetary gear set in order to create a multispeed powertrain.

It is another aim of the present disclosure to present a powertrain that is having a MR fluid actuator contributing to transform a low bandwidth powertrain into a high bandwidth powertrain.

Therefore, in accordance with a first embodiment of the present disclosure, there is provided a system for assisting a user in moving a door comprising: a magnetorheological (MR) fluid actuator unit including at least one torque source and at least one MR fluid clutch apparatus having an input coupled to the at least one torque source to receive torque from the at least one torque source, the MR fluid clutch apparatus controllable to transmit a variable amount of assistance force via an output thereof; an interface configured for coupling the output of the at least one MR fluid clutch apparatus to the door or surrounding structure; at least one sensor for providing information about the door; and a processor unit for controlling the at least one MR fluid clutch apparatus in exerting the variable amount of assistance force as a function of said information; wherein the system is configured for one of the MR fluid actuator unit and the interface to be coupled to a structure, and for the other of the MR fluid actuator unit and the interface to be coupled to the door for the assistance force from the MR fluid actuator unit to assist in moving the door.

Further in accordance with the first embodiment, in an instance, the MR fluid actuator unit comprises a speed reduction device coupling the torque source with the MR fluid clutch apparatus.

Still further in accordance with the first embodiment, in an instance, the speed reduction device is a worm drive, with the input of the MR fluid clutch apparatus having a worm wheel of the worm drive.

Still further in accordance with the first embodiment, in an instance, the speed reduction device is a planetary gear device, with the input of the MR fluid clutch apparatus being connected to the output of the planetary gear device.

Still further in accordance with the first embodiment, in an instance, the interface includes a tensioning member spooled to a wheel at the output of the MR fluid clutch apparatus.

Still further in accordance with the first embodiment, in an instance, a free end of the tensioning member is configured to be coupled to the door for pulling the door during movement, and wherein the MR fluid actuator unit is configured to be secured to the structure.

Still further in accordance with the first embodiment, in an instance, the door is a gate, and wherein the MR fluid actuator unit is configured to provide the assistance force to raise the gate to a closed position.

Still further in accordance with the first embodiment, in an instance, two of the MR fluid clutch apparatus are coupled to a single one of the torque source, the input of each of the MR fluid clutch apparatuses commonly connected to the single one of the torque source for allowing the MR fluid actuator unit to provide the assistance force bi-directionally onto the door.

Still further in accordance with the first embodiment, in an instance, the MR fluid actuator unit comprises a speed reduction device coupling the torque source with the two MR fluid clutch apparatuses.

Still further in accordance with the first embodiment, in an instance, the speed reduction device is a worm drive including a worm, with the inputs of the MR fluid clutch apparatuses each having a worm wheel meshed with the worm.

Still further in accordance with the first embodiment, in an instance, the interface includes a pair of tensioning members each spooled to a respective wheel at the output of each of the MR fluid clutch apparatuses.

Still further in accordance with the first embodiment, in an instance, the interface includes a lever, each of the tensioning members is connected to the lever configured to be coupled the door for converting the assistance force exerted by the MR fluid clutch apparatuses in opposite movements of the door, and wherein the MR fluid actuator unit is configured to be coupled to the structure.

Still further in accordance with the first embodiment, in an instance, the tensioning members are coupled to wheels on the lever.

Still further in accordance with the first embodiment, in an instance, the interface comprises a linkage between the lever and the door.

In accordance with a second embodiment, there is provided a vehicle comprising at least one door pivotally connected to a structure of the vehicle, and the system as described above for assisting a user in moving the door.

In accordance with a third embodiment, there is provided system for providing torque to a human-powered vehicle comprising: a magnetorheological (MR) fluid actuator unit including at least one torque source and at least one MR fluid clutch apparatus having an input coupled to the at least one torque source to receive torque from the at least one torque source, the MR fluid clutch apparatus controllable to transmit a variable amount of assistance torque via an output thereof; a vehicle interface configured for coupling the output of the at least one MR fluid clutch apparatus to a powertrain of the vehicle; and a processor unit for controlling the at least one MR fluid clutch apparatus in exerting the variable amount of assistance torque as a function of a requested assistance.

Further in accordance with the third embodiment, in an instance, further comprising at least one sensor for providing information indicative of a power applied to the powertrain by the user, and wherein the processor unit controls the at least one MR fluid clutch apparatus as a function of the requested assistance based on said information.

Still further in accordance with the third embodiment, in an instance, the powertrain includes a crankset, and wherein the vehicle interface is configured to be operatively coupled to the crankset.

Still further in accordance with the third embodiment, in an instance, the vehicle transmission includes an output gear coupled to the MR fluid clutch apparatus, the output gear configured for being coupled to a spindle of the crankset.

Still further in accordance with the third embodiment, in an instance, the output gear is configured for being mounted directly to the spindle.

Still further in accordance with the third embodiment, in an instance, wherein the output gear is configured for being mounted to a tube concentrically disposed around the spindle.

Still further in accordance with the third embodiment, in an instance, a chainring of the powertrain is mounted to the tube.

Still further in accordance with the third embodiment, in an instance, further comprising a one-way clutch or freewheel between the tube and the spindle.

Still further in accordance with the third embodiment, in an instance, further comprising a transmission component between the output of the MR fluid clutch apparatus and the output gear.

Still further in accordance with the third embodiment, in an instance, the powertrain includes at least one wheel axle, and wherein the vehicle interface is configured to be operatively coupled to the at least one wheel axle.

Still further in accordance with the third embodiment, in an instance, two of the MR fluid clutch apparatus are coupled to a single one of the torque source, with the MR fluid clutch apparatus each configured to be coupled to an own one of the wheel axle, the input of each of the MR fluid clutch apparatuses commonly connected to the single one of the torque source for allowing the MR fluid actuator unit to provide the assistance torque to the wheel axles.

In accordance with the fourth embodiment, there is provided a wheel chair comprising the system as described above, wherein the wheel axles support wheels of the wheelchair.

In accordance with the fifth embodiment, there is provided a vehicle comprising at least one powertrain, and the system as described above.

Further in accordance with the fifth embodiment, the vehicle is a bicycle.

In accordance with the sixth embodiment, there is provided a wheel assembly for use in manually displaced equipment comprising: a mount configured for securing the wheel assembly to the equipment; at least one wheel rotatably supported by the mount; a magnetorheological (MR) fluid actuator unit and including at least one torque source and at least one MR fluid clutch apparatus having an input coupled to the at least one torque source to receive torque from the at least one torque source, the MR fluid clutch apparatus controllable to transmit a variable amount of assistance force via an output thereof; a wheel transmission configured for coupling the output of the at least one MR fluid clutch apparatus to the caster for driving a rotation of the wheel; at least one sensor for providing information about a movement of the equipment; and a processor unit for controlling the at least one MR fluid clutch apparatus in exerting the variable amount of assistance force as a function of said information.

Further in accordance with the sixth embodiment, in an instance, the MR fluid actuator unit includes two of the MR fluid clutch apparatuses coupled to the wheel and arranged to respectively drive clockwise and counterclockwise rotations of the wheel.

Still further in accordance with the sixth embodiment, in an instance, the mount is a swivel mount configured for modifying an orientation of the wheel relative to the equipment.

Still further in accordance with the sixth embodiment, in an instance, the MR fluid actuator unit further comprising at least one other MR fluid clutch apparatus coupled to the swivel mount, and further comprising a swivel transmission for coupling the output of the other MR fluid clutch apparatus to the swivel mount for assisting in a rotation of the swivel mount.

Still further in accordance with the sixth embodiment, in an instance, the MR fluid actuator unit includes two of the other MR fluid clutch apparatuses coupled to the swivel mount and arranged to respectively drive clockwise and counterclockwise rotations of the swivel mount, and wherein the swivel transmission couples each of the other MR fluid clutch apparatuses to the swivel mount.

Still further in accordance with the sixth embodiment, in an instance, a single one of said motor is provided for a plurality of the MR fluid clutch apparatuses.

Still further in accordance with the sixth embodiment, in an instance, a reduction device is between the motor and the at least one MR fluid clutch apparatus.

In accordance with the seventh embodiment, there is provided a load-transporting apparatus comprising at least one wheel assembly as described above rotatably connected to a support platform configured to transport a load.

Further in accordance with the seventh embodiment, in an instance, comprising at least three wheel assemblies rotatably connected to the support platform to rollingly interface the support platform against the ground, at least one of the wheel assemblies being the wheel assembly as described above.

Still further in accordance with the seventh embodiment, in an instance, the two of the wheels of the load-transporting apparatus are driven by at least one MR fluid actuator unit, the wheels being driven in opposite directions, for a single one of the wheels driven to displace the load-transporting apparatus in a first direction, another single one of the wheels driven to displace the load-transporting apparatus in a second direction, and with a concurrent driving of the two wheels displacing the load-transporting apparatus in at least a third direction.

Still further in accordance with the seventh embodiment, in an instance, the wheel of the at least one wheel assembly is operatively mounted to a guide rail.

In accordance with the eighth embodiment, there is provided a system for assisting a user in moving a device relative to a structure comprising: a magnetorheological (MR) fluid actuator unit including at least one torque source and at least one MR fluid clutch apparatus having an input coupled to the at least one torque source to receive torque from the at least one torque source, the MR fluid clutch apparatus controllable to transmit a variable amount of assistance force via an output thereof; an interface configured for coupling the output of the at least one MR fluid clutch apparatus to the device or surrounding structure; at least one sensor for providing information about a movement of the device; and a processor unit for controlling the at least one MR fluid clutch apparatus in exerting the variable amount of assistance force as a function of said information; wherein the system is configured for one of the MR fluid actuator unit and the interface to be coupled to the structure, and for the other of the MR fluid actuator unit and the interface to be coupled to the device for the assistance force from the MR fluid actuator unit to assist in moving the device.

Further in accordance with the eighth embodiment, in an instance, the surrounding structure is a building.

Still further in accordance with the eighth embodiment, in an instance, the surrounding structure is the ground.

In one embodiment, the powertrain includes a human power source and additional power source; a multi-speed transmission connected to a final drive; and a selectively engageable magnetorheological fluid clutch (MRF) drivingly connected between the additional source and the multi-speed transmission. An additional power source is operatively connected to the magnetorheological fluid clutch for selectively providing power to the powertrain or to drive the multi-speed transmission via the magnetorheological fluid clutch, and in some configurations, to receive energy from the magnetorheological fluid clutch for regenerative braking.

The powertrain may also include a controller/drive unit and energy storage device operatively connected to the additional power source. The additional power source may be operatively connected directly to the human power source and to magnetorheological fluid clutch. Alternatively, the additional power source is directly connected to the magnetorheological fluid clutch and operatively connected to the human power source by engagement of the magnetorheological fluid clutch.

The multi-speed transmission may be a continuously variable transmission or a planetary multi-speed transmission.

The additional power source may be connected to the input side or the output side of the magnetorheological fluid clutch.

These and other objects, features and advantages according to the present invention are provided by a human-hybrid powertrain including a frame or skeleton, user actuation means connected to the frame or skeleton for being engaged and moved by a user in order to provide human power to the powertrain of the vehicle, an additional source of power and MR fluid actuation means or a MR fluid actuator operatively connected in parallel to the human power input of the powertrain for applying controllable additional power to the system thereof. The MR fluid modulation means preferably includes a MR fluid having a controllable viscosity, a housing connected to the apparatus frame or skeleton and which contains the MR fluid, and a rotatable shaft extending outwardly from the housing and operatively connected between the MR fluid and the powertrain.

Control means, such as a microprocessor operating under program control, is preferably operatively connected to the MR fluid force modulation means for causing a predetermined magnetic field strength to be applied to the MR fluid based upon a selected force modulation program that can take into account information from sensors. Accordingly, a desired amount of force or power from the additional power source can be provided to the powertrain in order to increase or decrease output of the powertrain during the vehicle usage. The system may further comprise a sensor to measure the input of the human power force or power to the system in order to control the output required by the additional power source.

The human-hybrid powertrain preferably further comprises a display and operatively connected to the control means. The control means also preferably includes means for permitting the input of program or parameters. In addition, a sensor is preferably associated with the MR fluid force modulation means and is connected to the control means for generating and displaying on the display the additional force or power provided by the additional source of power.

It is to be noted that the present invention can be used on all kind of human-hybrid powertrains, using various human input like the arms, hands, feet, legs or any other body part. Also, the human-hybrid powertrain can be used on various types of vehicle or equipment like moped, push scooter, personal walker, human powered car, hand powered cart, human pulling trolley, rowing boat, human powered plane, ambulance stretcher, bicycle trailer, wheelbarrow, ceiling hoist, electric door opener only to name a few.

In equipment, the human-hybrid powertrain may be used to move objects combining the human power with an additional source power. Benefit and principles stay the same than with vehicles. The objectives may still be to increase acceleration, improving control over the equipment or to provide more range to the operated human equipment. A good example of this is a pallet jack that is easily moved around inside the warehouse but that may become difficult to push in the parking lot where the surface is uneven or where there are ramps. The addition to this equipment of a MR fluid actuator connected to one of more wheel would bring benefits. Sensor or sensors may be installed on the push handle and power sent to the wheel or wheel send in proportion to the effort generated by the user, so the user always stays in control of the piece of equipment.

Therefore, in accordance with the present disclosure, there is provided:

DESCRIPTION OF THE DRAWINGS

FIG. 10' is a schematic view of an MR fluid actuator unit using one of the MR fluid clutch apparatus of FIG. 1, the MR fluid actuator used to decouple the motor and speed reducer from the Rotary-to-Rotary or Rotary-to-Linear converter;

FIG. 10" is a schematic view of an MR fluid actuator unit using one or more of the MR fluid clutch apparatus of FIG. 1, all MR fluid actuators connected to the same speed reducer and actuating different Rotary-to-Rotary or Rotary-to-Linear converters;

FIG. 12' is a schematic view of a similar human-hybrid powertrain illustrated on FIG. 12 with an additional MR fluid clutch used to decouple the human powered pedal from the powertrain;

FIG. 13' is a schematic view of a similar human-hybrid powertrain shown on FIG. 13 but with an additional MR fluid clutch used to brake an additional port of the planetary gear device, allowing for various torque/speed ratio to be outputted from the high impedance motor and speed reducer combination;

FIG. 20' is a schematic view of a vehicle tail gate including a human-hybrid powertrain used to provide assistance for door operation with the powertrain connected to a mechanism;

FIG. 21' is a schematic detailed view of a vehicle tail gate powertrain including a single MR clutch apparatus in an inline arrangement;

FIG. 24' is a detailed schematic detailed view of the door powertrain of FIG. 24;

DETAILED DESCRIPTION

Figure 1:
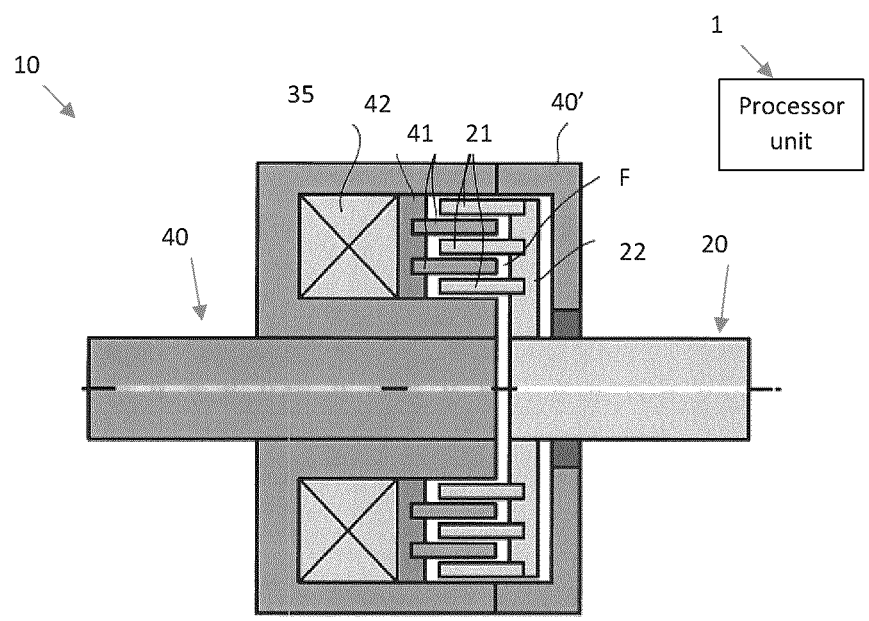
FIG. 1 is a schematic view of a generic MR fluid clutch apparatus, used by various embodiments of the present disclosure.

Referring to FIG. 1, there is illustrated a generic magnetorheological (MR) fluid clutch apparatus 10 configured to provide a mechanical output force based on a received input current provided by a processor unit 1 controlling the MR fluid clutch apparatus 10. The processor unit 1 is any type of electronic or electric device having controlling capability to control input current sent to the MR fluid clutch apparatus 10. In an embodiment, the processor unit 1 may receive signals from sensors, and compute data, for instance by way of firmware, to control the operation of the MR fluid clutch apparatus 10 based on settings, on requested assistance, etc, as will be explained hereinafter. The MR fluid clutch apparatus 10 has a driving member 20 with a disk 22 from which project drums 21 in an axial direction, this assembly also known as input rotor 20. The MR fluid clutch apparatus 10 also has a driven member 40 with a disk 42 from which project drums 41 intertwined with the drums 21 to define an annular chamber(s) filled with an MR fluid F. The assembly of the driven member 40 and drums 41 is also known as the output rotor 40. The annular chamber is delimited by a casing 40' that is integral to the driven member 40, and thus some surfaces of the casing 40 opposite the drums 21 are known as shear surfaces as they will collaborate with the drums 21 during torque transmission, as described below. The driving member 20 may be an input shaft in mechanical communication with a power input, and driven member 40 may be in mechanical communication with a power output (i.e., force output, torque output). MR fluid F is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid F comprised between opposite shear surfaces—i.e., that of the drums 21 on the driving side, and that of the drums 41 and of the shear surfaces of the casing 40' in the annular chamber. The magnetic field intensity mainly affects the yield shear stress of the MR fluid. The yield shear stress of the fluid when in its active ("on") state may be controlled by varying the magnetic field intensity produced by electromagnet 35 integrated in the casing 40', i.e., the input current, via the use of a controller. Accordingly, the MR fluid's ability to transmit force can be controlled with the electromagnet 35, thereby acting as a clutch between the members 20 and 40. The electromagnet 35 is configured to vary the strength of the magnetic field such that the friction between the members 20 and 40 is low enough to allow the driving member 20 to freely rotate with the driven member 40 and vice versa, i.e., in controlled slippage.

The driving member 20 is driven at a desired speed by a power source, like a rotary geared electric motor, and the output rotor is connected to a mechanical device to be controlled. The torque transmitted by the MR fluid clutch apparatus 10 is related to the intensity of the magnetic field passing through the MR fluid. The magnetic field intensity is modulated by a coil of the electromagnet 35.

Figure 2:
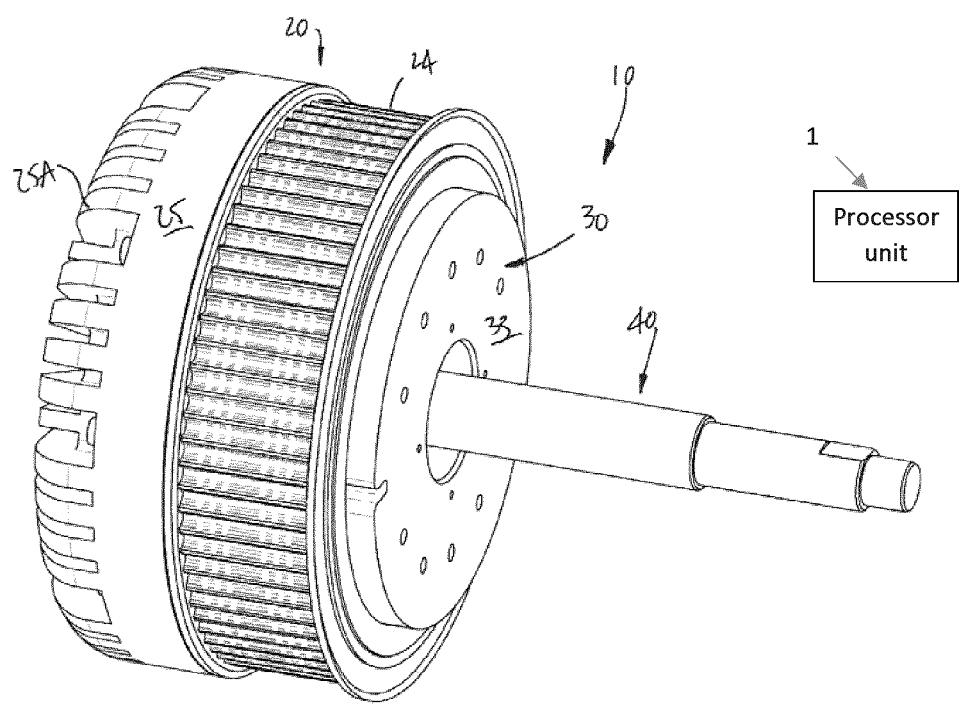
FIG. 2 is a perspective view of an MR fluid clutch apparatus of the present disclosure, as assembled.
Figure 3:
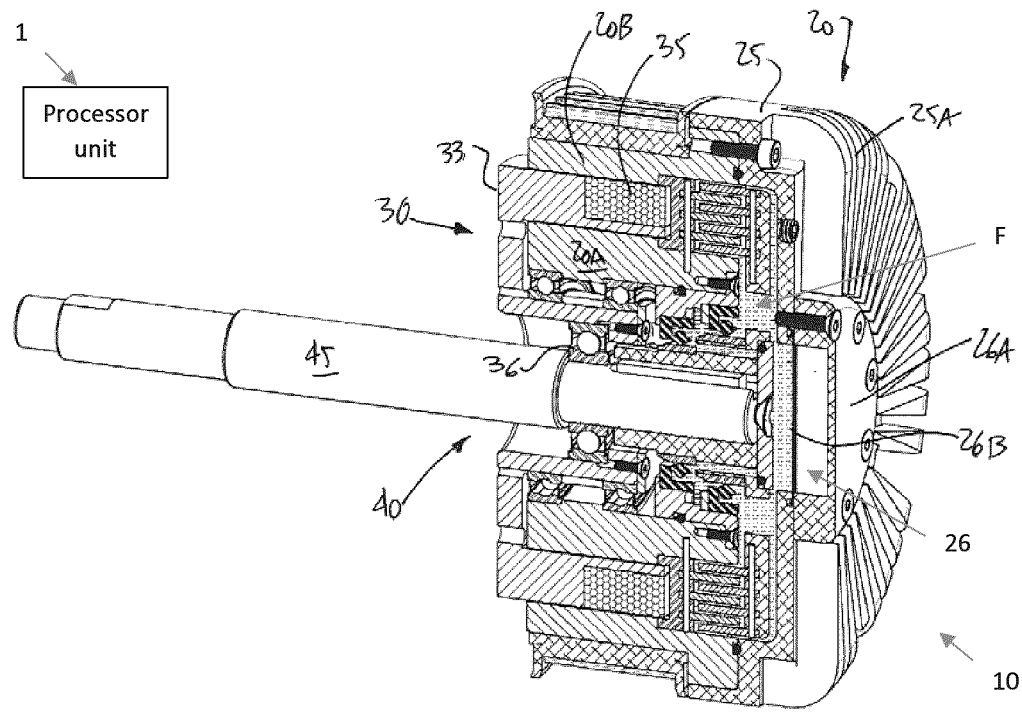
FIG. 3 is a partly sectioned view of the MR fluid clutch apparatus of FIG. 2.
Figure 4:
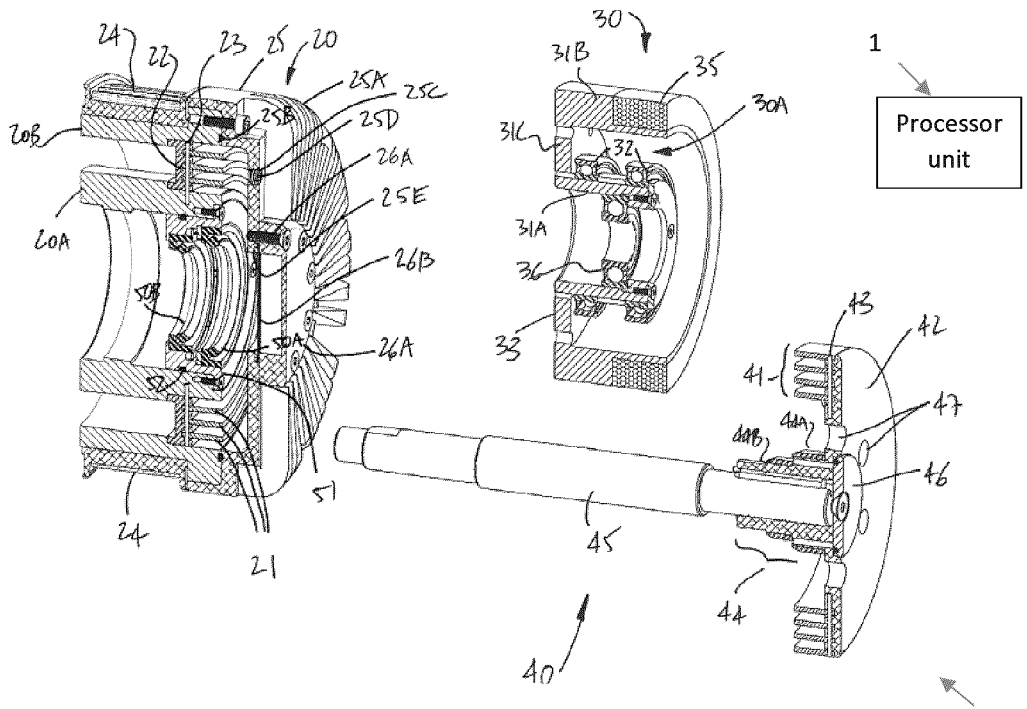
FIG. 4 is an exploded view of the MR fluid clutch apparatus of FIG. 2.

Referring to FIGS. 2, 3 and 4, the MR fluid clutch apparatus is generally shown at 10 as a whole. The MR fluid clutch apparatus 10 has similar components as the generic exemplary MR fluid clutch apparatus 10 of FIG. 1, whereby like reference numerals will refer to like components. The MR fluid clutch apparatus 10 has the input rotor 20, also known as the driving member, a stator 30 (including a coil), and the output rotor 40 also known as the driven member, and a MR fluid is located in an MR fluid chamber that is defined in the free space including the space between the drums of the rotor 20 and the rotor 40.

The input rotor 20 may be driven at a constant or variable speed prescribed by a rotary power source, not shown, like a rotary internal combustion engine or electric motor. The output rotor 40 is connected to a mechanical output, not shown, to be controlled. When a current circulates in the coil 35 of the stator 30, a magnetic field is induced in the stator 30 and passes through the drums and the MR fluid F. Then, a torque, dependent on the magnetic field intensity, is transmitted from the input rotor 20 to the output rotor 40 by shearing the MR fluid F in between the drums. Although the description that follows indicates that the rotor 20 is the input rotor and the rotor 40 is the output rotor, it is pointed out that the rotor 20 could be the output rotor and the rotor 40 could be the input rotor. However, for the sake of clarity and simplicity and to avoid unnecessary redundancy, the description will pursue with "input rotor 20" and "output rotor 40".

As best seen in FIGS. 3 and 4, the input rotor 20 has an inner magnetic core 20A and an outer magnetic core 20B, spaced apart from one another. The inner magnetic core 20A and outer magnetic core 20B are made of a ferromagnetic material that may have a high permeability, a high magnetization saturation, a high electrical resistivity and low hysteresis, such as silicon iron. Materials having a high electrical resistivity allow the magnetic field to establish faster by minimizing Eddy current and thus enhanced dynamic performance is achieved.

Cylindrical input drums 21 are secured to a drum holder 22 (also known as disc, plate, ring, etc), with the drum holder 22 spanning the radial space between the inner magnetic core 20A and the outer magnetic core 20B. In an embodiment, the drums 21 are in a tight-fit assembly in channels of the drum holder 22 and dowel pins 23 pass through all drums 21. The dowel pins 23 may also penetrate the inner magnetic core 20A, as shown in FIGS. 3 and 4. The drum holder 22 may consist of a non-ferromagnetic material to minimize the magnetic field passing through it and may also have a high electrical resistivity to minimize resistive loss during transient operation of the MR clutch apparatus 10.

In an example among many others, the input rotor 20 may be driven by a power source through a timing belt pulley, or any other driving member, like a chain sprocket, a gear, a flat belt pulley or a V-belt pulley. For illustrative purposes, a pulley portion 24 is provided for interconnection with a belt (not shown), the pulley portion 24 being a toothed pulley for cooperation with a timing belt (a.k.a., toothed, cog, synchronous belt). The pulley portion 24 may be tight-fitted or glued or positively locked to the outer magnetic core 20B, using mechanical fasteners, or the like.

A cover 25 is fixed to the outer magnetic core 20B, and in an embodiment made of aluminum for cooling purposes. Thermal fins 25A are present on the cover 25 so that the MR fluid clutch apparatus 10 is cooled down by forced convection when the input rotor 20 is driven at a constant speed. The thermal fins 25A help to decrease the operating temperature of the MR fluid and may thus improve the life of the MR fluid clutch apparatus 10. The cover 25 may press a face static seal 25B onto the outer magnetic core 20B to prevent MR fluid leakage. Fill ports 25C may be defined through the cover 25, to fill the MR fluid clutch apparatus 10 with MR fluid. As illustrated, the fill ports 25C may be tapped and plugged using sealed set screws 25D among other solutions.

A central hole 25E in the cover 25 is closed by an expansion chamber cap 26A equipped with a flexible membrane 26B to allow MR fluid expansion during either temperature increase or MR fluid phase transition when aged. To counter the bulging of the membrane 26B due to the MR fluid, some compliant material, such as polyurethane foam, may be placed in the empty expansion volume between the expansion chamber cap 26A and the flexible membrane 26B. The compliant material therefore exerts a biasing pressure on the membrane 26B. Also, a vent hole may be present in the expansion chamber cap 26A to avoid excessive pressure build up in the empty expansion volume. Expansion chamber 26 may also be formed with a compressible material (e.g., closed cell neoprene) that may take less volume as the pressure increases in the MR Fluid F. If a compressible material is present, the expansion chamber may not need a vent hole and may not need a membrane 26B.

Still referring to FIGS. 3 and 4, the stator 30 is made of a ferromagnetic material to guide the magnetic field. The stator 30 may have an annular body with an annular cavity 30A formed in its U-shaped section. The inner magnetic core 20A is received in the annular cavity 30A, which may be defined by an inner annular wall 31A, an outer annular wall 31B, and a radial wall 31C, all of which may be a single monolithic piece. The inner magnetic core 20A is rotatably supported by one or more bearings 32, a pair being shown in FIGS. 3 and 4. Although the bearings 32 are shown located between the inner magnetic core 20A and the stator 30, inward of the inner magnetic core 20A, it is considered to position the bearings 32 elsewhere, such as in radial fluid gaps described below. The stator 30 is for instance connected to a structure via bores on its outer face 33 (that is part of the radial wall 31C), and is thus the immovable component of the MR fluid clutch apparatus 10 relative to the structure.

Figure 5:
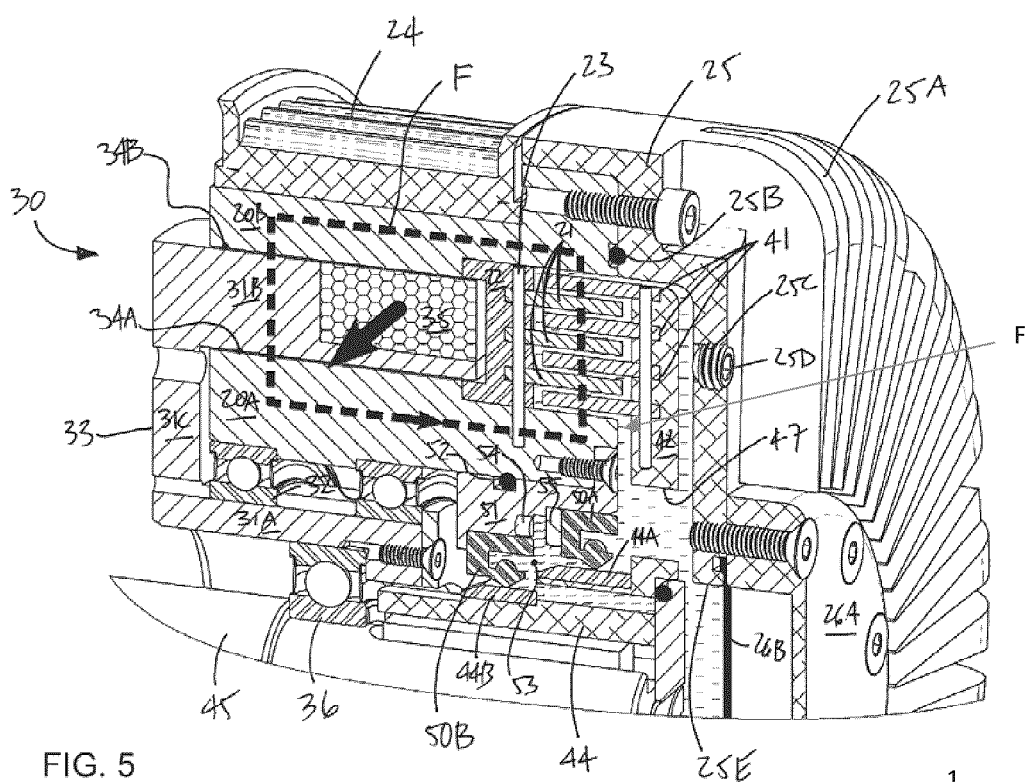
FIG. 5 is an enlarged view of the MR fluid clutch apparatus of FIG. 2, showing a magnetic field induced by a coil.
Figure 5:
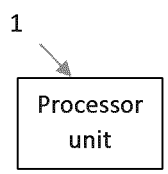

As best seen in FIG. 5, the stator 30 is sized such that radial fluid gaps 34A and 34B may be defined between the stator 30, and the inner magnetic core 20A and outer magnetic core 20B, respectively. The radial fluid gaps 34A and 34B, during use, are filled with a fluid, such as air and other gases, or lubricating and/or cooling liquids like oil, grease, etc. Hence, the radial fluid gaps 34A and 34B are free of solids during use. Coil 35 is secured to the annular body of the stator 30, for instance using an adhesive. It is contemplated to provide a slot through the stator 30 for passing wires connected to the coil 35, for powering the MR fluid clutch apparatus 10. The stator 30 further comprises one or more bearings 36 for rotatably supporting the output rotor 40, as described hereinafter.

The coil 35 may be wound using a high copper factor winding method. A higher copper ratio may lead to improved efficiency. Also considered are winding methods allowing flat wire winding, horizontal stacking, cylindrical stacking, for example. Multilayer PCBA winding is also considered (Heavy Copper PCBA) instead of copper only.

The bearings 32/36 are greased and may use no-contact seals to limit friction loss. The bearing arrangement featuring bearing(s) between the input rotor 20 and the stator 30, and separate bearing(s) between the stator 30 and the output rotor 40 enhances the safety of the MR fluid clutch apparatus 10. For example, if the input rotor 20 is jammed with the stator 30, the output rotor 40 is still free to rotate. Inversely, if the output rotor 40 is jammed with the stator 30, the power source that drives the input rotor 20 can still rotate.

The output rotor 40 has cylindrical output drums 41 that are secured to a drum holder 42 (e.g., plate, disc, etc) by a tight-fit assembly on the inner diameter of the drums 41. Dowel pins 43 may pass through the drums 41, among other ways to connect the output drums 41 to the drum holder 42. The output drums 41 are ferromagnetic so that the magnetic field easily passes through them (for example, with an equivalent magnetic flux in each of the drums). The drum holder 42 is made of a non-ferromagnetic material to minimize the magnetic field passing through it, like an aluminum alloy, to reduce the inertia of the output rotor 40.

The drum holder 42 has a shaft interface 44 by which it is connected to a shaft 45. In an embodiment, the shaft interface 44 is a sleeve-like component that is rotationally coupled to the shaft 45, and may have wear sleeves 44A and 44B. The output rotor 40 is locked in rotation to the output shaft 45 by a key or any other locking device (splines, tight-fit, etc. . . . ). A sealed shaft cap 46 is used to axially maintain the output rotor 40 relatively to the output shaft 45 and to prevent MR fluid leakage. A flat portion for a key may be defined on the output shaft 45 to ease screwing the shaft cap 46. This arrangement is one among others to connect the drum holder 42 to the shaft 45, such that the shaft 45 may receive the driving actuation from the input rotor 20 via the drum holder 42. The drum holder 22 further comprises throughbores 47 that may be circumferentially distributed therein to allow MR fluid circulation. As shown in FIGS. 3 and 4, the throughbores 47 are between the drums 41 and the shaft interface 44.

The MR fluid clutch apparatus 10 may use an odd number of drums 21 and 42, for example a mean value of about 7. More or less drums may be used according to the application. Using more than one drum helps to decrease the overall volume and weight of the MR fluid clutch apparatus for a given desired torque and a given diameter, as using multiple drums helps to reduce both the drum length and the cross-sections of the inner magnetic core 20A and the outer magnetic core 20B. In the same time, the time response of the magnetic circuit is improved because the Eddy currents are minimized when the cross-sections of the magnetic cores are lower.

Referring to FIG. 5, the magnetic field F induced by the coil 35 follows a closed path which goes through the annular wall 31B of the stator 30, the radial fluid gap 34B, the outer magnetic core 20B, the MR fluid, the drums 21 and 41, the inner magnetic core 20A, and the radial fluid gap 34A. The radial fluid gaps 34A and 34B allow the coil 35 to be energized without the use of slip rings. In fact, the typical friction slip rings are replaced by magnetic slip rings performed by the two radial fluid gaps 34A and 34B. The radial fluid gaps 34A and 34B are radial rather than axial for two reasons. Firstly, radial tolerance is readily reached so that the fluid gaps can be quite small (<0.2 mm) and thus the additional number of turns in the coil required to magnetize the fluid gaps 34A and 34B is minimized. Secondly, the magnetic attractive force in the fluid gaps 34A and 34B between the stator 30 and both magnetic cores 20A and 20B is nearly cancelled due to the rotational symmetry of the fluid gaps 34A and 34B. If the fluid gaps were axial, high magnetic attractive forces would be present and would load the bearings axially.

Figure 6:
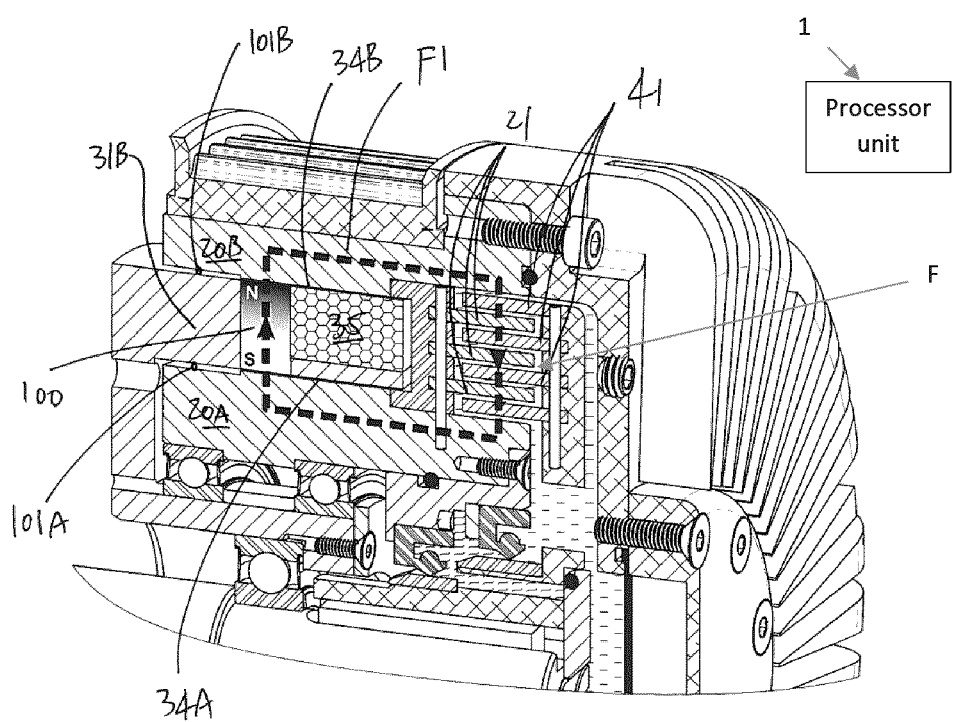
FIG. 6 is a partly sectioned view of the MR fluid clutch apparatus with a permanent magnet with a coil in an unpowered state, in accordance with the present disclosure.
Figure 7:
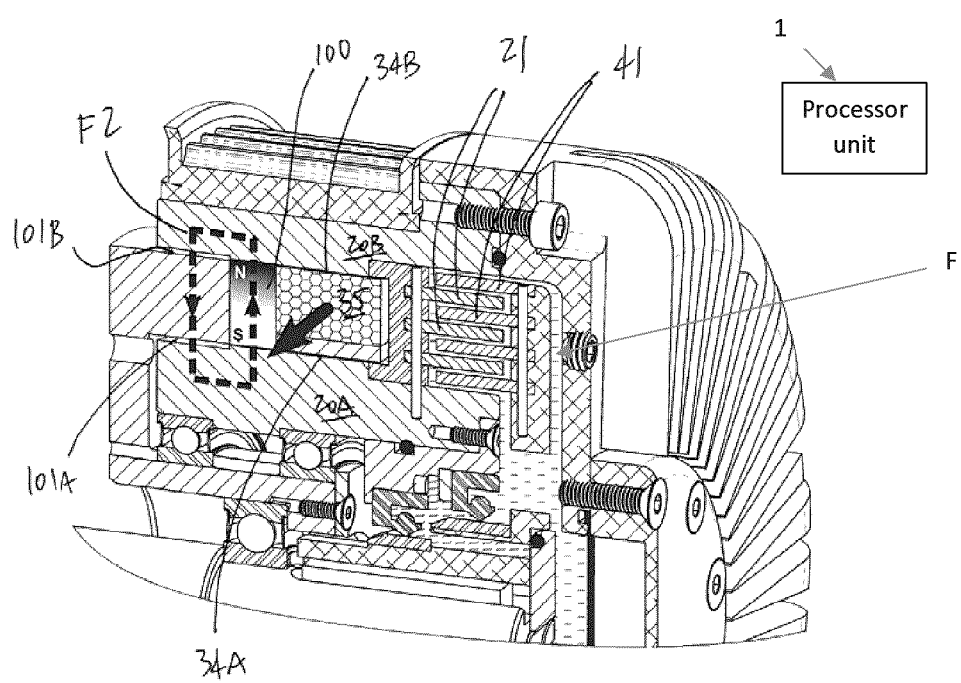
FIG. 7 is a partly sectioned view of the MR fluid clutch apparatus of FIG. 6, with the coil in a powered state.

Referring to FIGS. 6 and 7, the MR fluid clutch apparatus 10 is shown in yet another embodiment. The MR fluid clutch apparatus 10 of FIGS. 6 and 7 has numerous similar components with the MR fluid clutch apparatus 10 of FIGS. 3 to 6, whereby like elements will bear like numeral references, and their description is not duplicated unnecessarily herein. A distinction lies in the presence of a permanent magnet 100 in the outer annular wall 31B, in addition to the coil 35.

As shown in FIG. 6, the permanent magnet 100 is used to generate a magnetic field F1 in the MR fluid clutch apparatus 10 so that the apparatus 10 can transfer a constant output torque without the need to apply a current via the coil 35. The permanent magnet 100 is radially magnetized and may be a full solid annular part or an assembly of individual magnets (such as cylindrical magnets). Other radial fluid gaps 101A and 101B, "redirection gaps", separate the part of the annular wall 31B on the opposite side of the permanent magnet 100 than the coil 35, from the inner magnetic core 20A and the outer magnetic core 20B.

When no current is applied to the coil 35, as in FIG. 6, magnetic field F1 is present in the MR fluid according to the described magnetic flux path shown. Some magnetic flux circulates through the other radial fluid gaps 101A and 101B, separating the stator 30 from the inner magnetic core 20A and the outer magnetic core 20B. These gaps 101A and 101B are a bit wider than the gaps 34A and 34B, the width being in a radial direction. The width of the redirection gaps 101A and 101B controls the amount of magnetic flux desired in the MR fluid, a.k.a. the desired constant torque when no current is applied to coil 35. If the redirection gaps 101A and 101B are sufficiently wide, almost all the magnetic flux induced by the permanent magnet 100 goes through the MR fluid, leading to a high DC torque. If the redirection gaps 101A and 101B are radially narrower, the magnetic flux is shared between the MR fluid and the redirection gaps 101A and 101B, leading to a lower DC torque.

Figure 11:
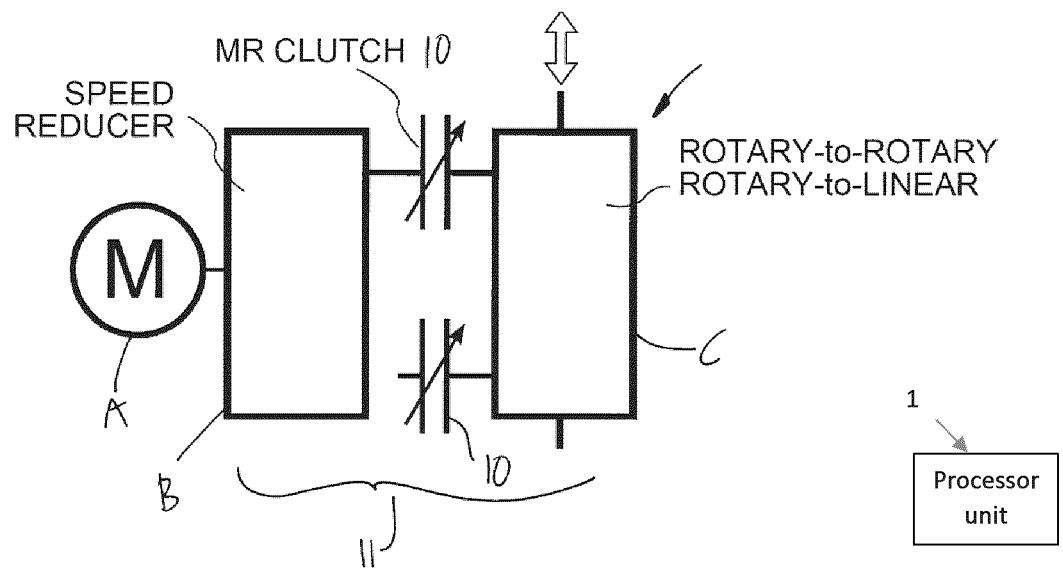
FIG. 11 is a schematic view of an MR fluid actuator unit using one or more of the MR fluid clutch apparatus of FIG. 1, one of the MR fluid clutch connected to a fixed part and one MR fluid clutch connected to the speed reducer.

When a current is applied in the coil 35 according to the direction shown in FIG. 11 and the indicated polarity of the permanent magnet 100, the magnetic flux induced by the permanent magnet 100 is redirected in the redirection gaps 101A and 101B as shown by F2, which leads in a decrease of the torque of the MR fluid clutch apparatus 10. At a certain intensity of the coil current, the magnetic flux F1 in the MR fluid can be nearly cancelled and passed this intensity, it will increase again. The width of the redirection radial fluid gaps also controls the size of the winding of the coil 35. If the width is high, a bigger winding is required to redirect the magnetic flux.

If the current is applied in the reverse direction, the coil 35 assists the permanent magnet 100 in the generation of magnetic flux in the MR fluid, leading to the increase of the torque of the MR clutch apparatus 10.

Accordingly, the MR fluid clutch apparatus 10 has a normally "on state" for the MR fluid, because of the magnetic field induced by the permanent magnet 100. The coil 35 may then be powered to cause the MR fluid clutch apparatus 10 to reduce torque transmission and eventually be in an off state. This arrangement is useful for example when the MR fluid clutch apparatus 10 must maintain torque transmission in spite of a power outage. The magnetic field of the permanent magnet 100 would be of sufficient magnitude for the MR fluid clutch apparatus 10 to support a load without being powered.

Figure 8:
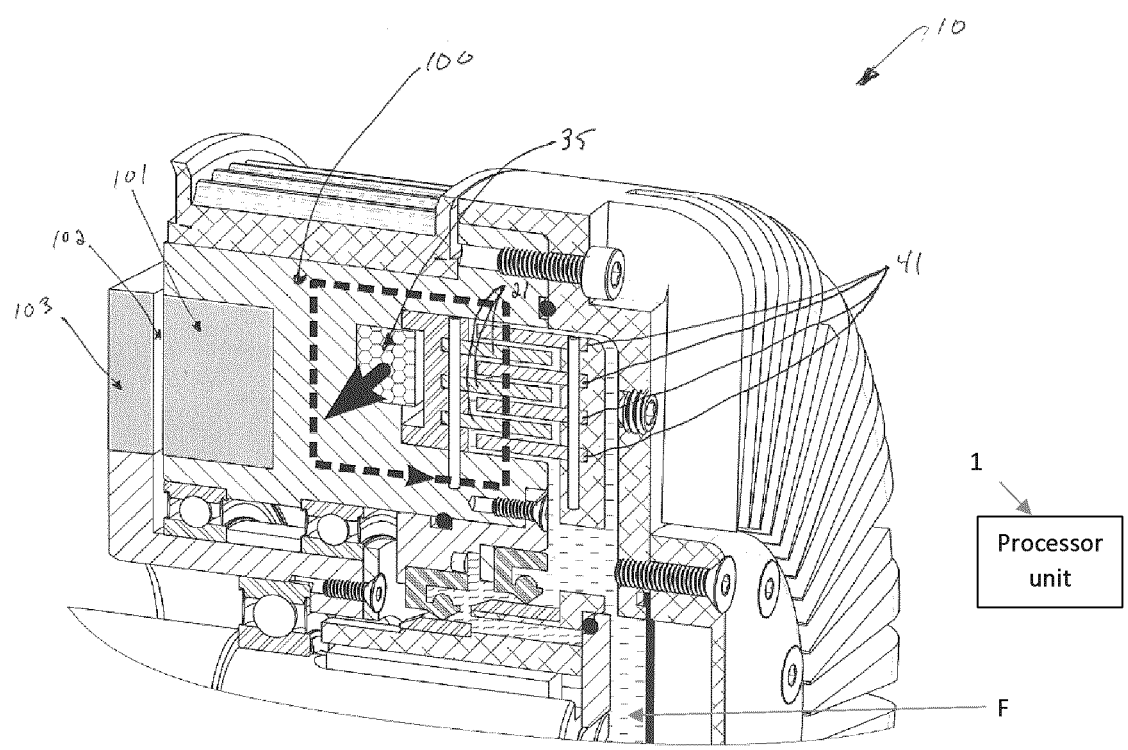
FIG. 8 is a schematic view of a generic magnetorheological (MR) fluid clutch apparatus, incorporating an axial fluid gap for power transmission.
Figure 9:
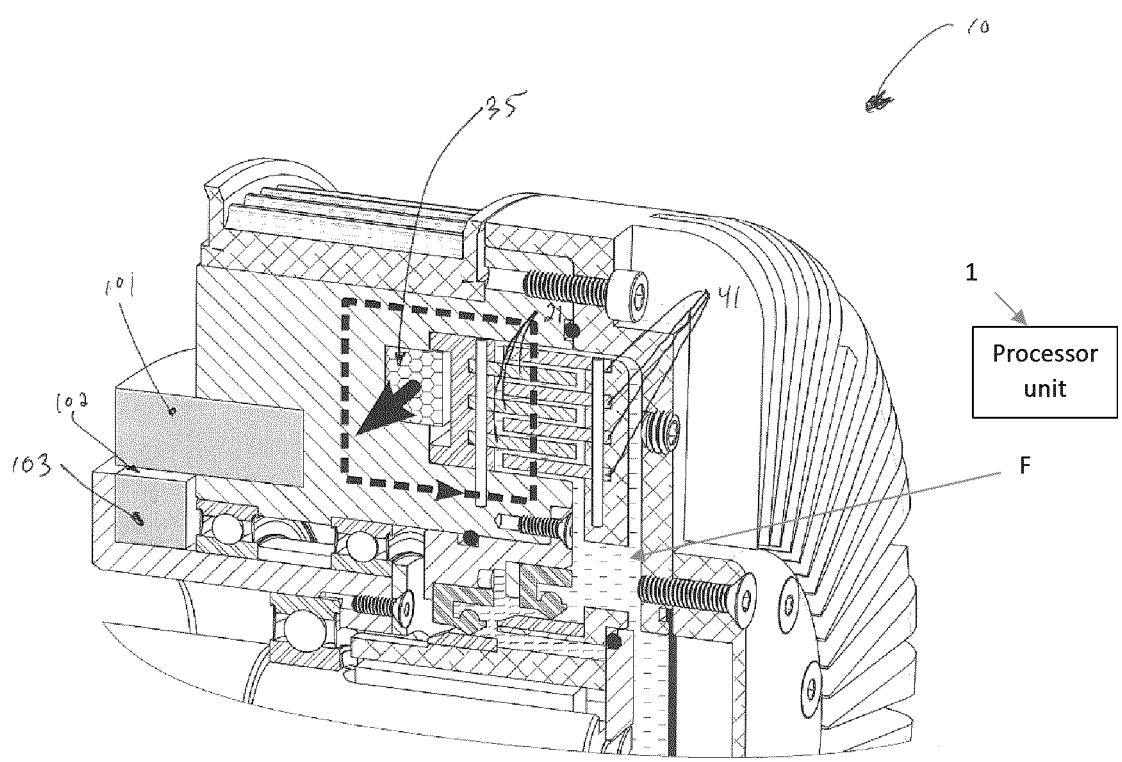
FIG. 9 is a schematic view of a magnetorheological (MR) fluid clutch apparatus, incorporating a radial fluid gap for power transmission.

As seen on FIG. 8, in an alternate construction of the clutch 10, the coil 35 of the clutch could be mounted on one of the rotating member of the clutch, here the magnetic core 100. The magnetic field F induced by the coil 35 follows a closed path which goes through the magnetic core 100, the MR fluid, the drums 21 and 41, the magnetic core 100. The coil 35 may be electrically linked to a power receiver 101 that is mounted on one the rotating part, here the magnetic core 100. An axial fluid gap 102 is provided between the power receiver 101 and a power emitter 103. The fluid gap or gaps 102 allow the power receiver 101 to be energized without the use of slip rings. In fact, the typical friction slip rings are replaced by contactless power slip ring or rings performed by the power emitter 103, the fluid gap 102 and the power receiver 101, allowing the clutch to do multiple turns. In FIG. 8, the fluid gap is axial (i.e., it lies in a plane to which the rotational axis is normal). As seen in FIG. 9, the fluid gap may be radial (it is annular in shape). In FIG. 9, the radial fluid gap 104 may separate the power emitter 103 and the power receiver 101.

In both FIG. 8 and FIG. 9, the contactless power emitter 103 may also receive signal or signals from the power receiver 101 and the power receiver 101 may transmit a signal or signals to the power emitter 103. The power receiver is then electrically linked to the coil 35 and to some sensor (not illustrated). The advantage of this contactless power transmission system is that the magnetic core reluctance is decreased by the elimination of the reluctance of the fluid gaps. Hence, power required in order to generate the equivalent magnetic flux in the MR fluid is reduced. The size of the coil 35 can then be reduced. The other advantage is that the heat dissipation in the coil 35 is also reduced, hence decreasing the cooling requirement of the clutch 10. An additional advantage is that the overall efficiency of the clutch is increased.

Figure 10:
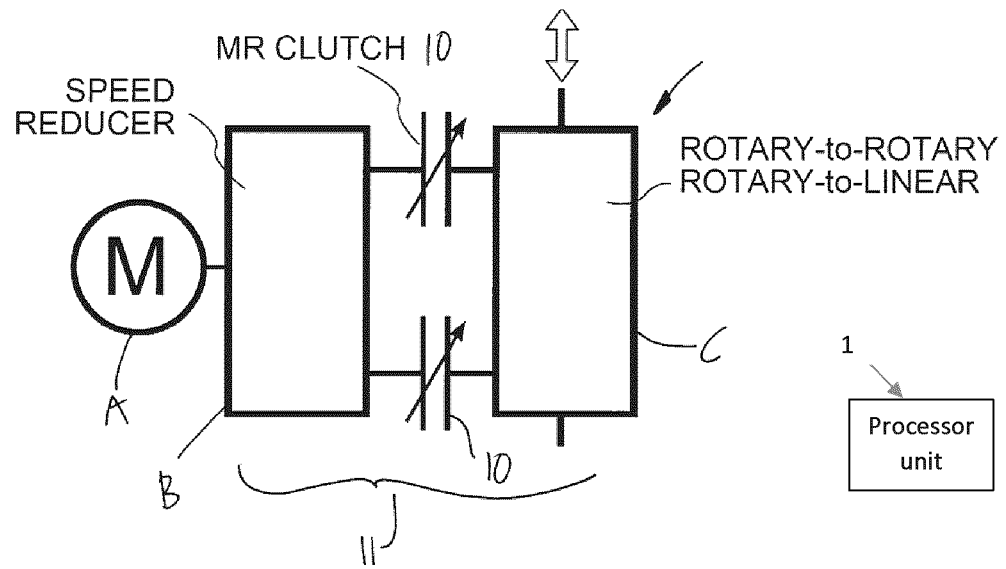
FIG. 10 is a schematic view of an MR fluid actuator unit using one or more of the MR fluid clutch apparatus of FIG. 1, both MR fluid actuators connected to the speed reducer and turning in opposite direction.
Figure 10:
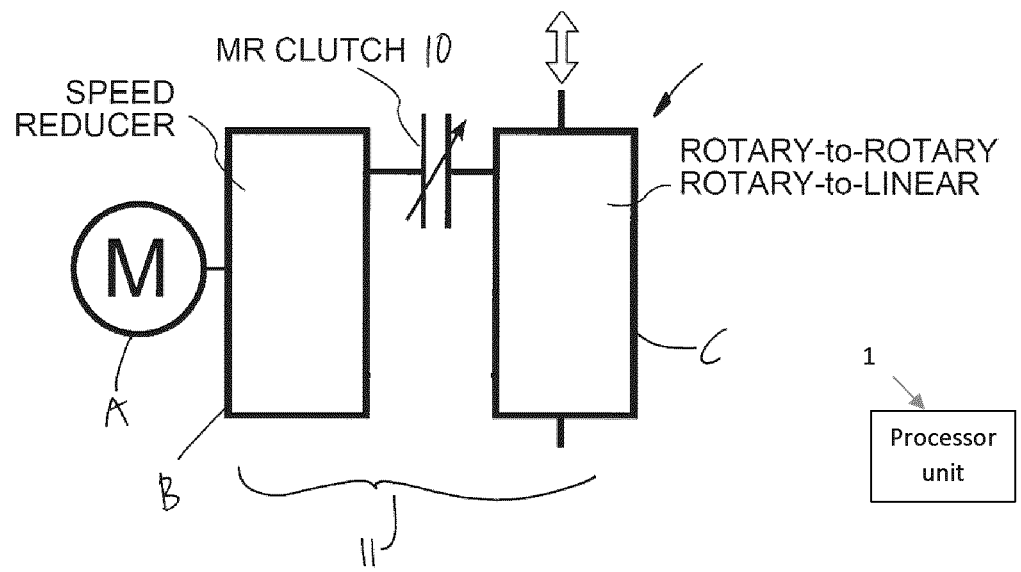
Figure 10:
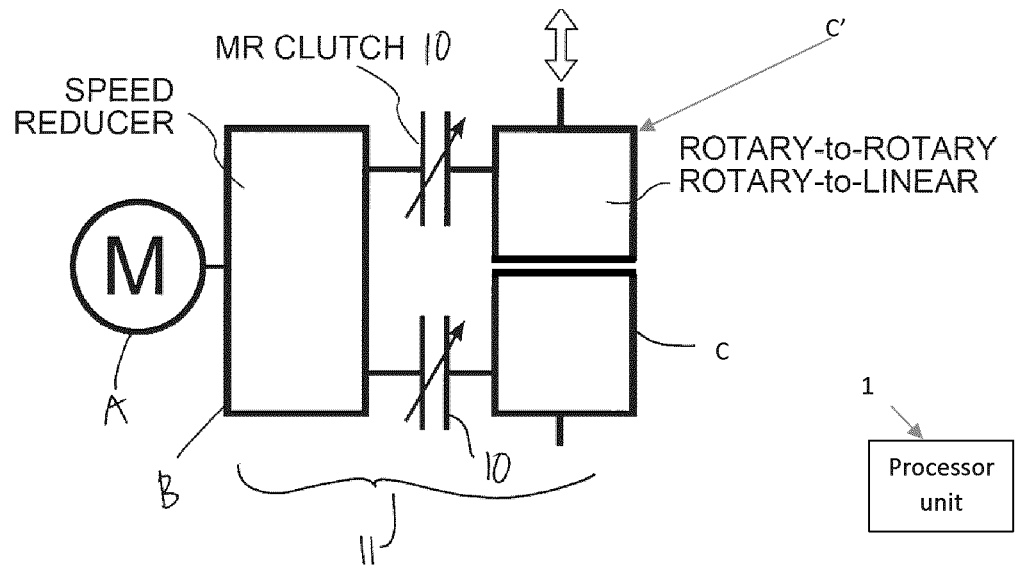

Referring to FIG. 10, the MR fluid actuator unit 11 is generally shown as being constituted of a power source A (e.g., a motor), a speed reducer B, at least one of the MR fluid clutch apparatuses 10 and an output device C or mechanism. The output device C may be a rotary-to-rotary device, or a rotary-to-linear device. In FIG. 10, the MR fluid actuator unit 11 has two MR fluid clutch apparatuses 10 turning in opposite directions. In this arrangement, when in off-state mode while the input shaft is turning, the viscous torque generated by the MR fluid clutch apparatuses 10 act in opposite direction thus they are not substantially transmitted to the output device C. The output of the rotary-to-rotary device, or a rotary-to-linear device may be controlled independently of the viscous torque generated in the MR fluid clutches apparatuses 10 when in off-state mode while the input shaft is turning by applying a force on either end of the converter.

Referring to FIG. 10', the MR fluid actuator unit 11 shown is similar to MR fluid actuator unit 11 of FIG. 10, with the difference that it is constituted of a single MR fluid clutch apparatus 10. In this configuration, the viscous torque may be transmitted to the rotary-to-rotary device or a rotary-to-linear device, slightly reducing the controllability of the system but decreasing the number of components required.

Referring to FIG. 10", the MR fluid actuator unit 11 shown is similar to the MR fluid actuator unit 11 of FIG. 10', with the difference that two or more MR fluid clutch apparatuses 10 are connected to the same speed reducer B, the two or more MR fluid clutch apparatuses 10 being connected to individual rotary-to-rotary device, or a rotary-to-linear device. This arrangement may be useful to control individually a human-hybrid powertrain that has more than one output. This system may also include additional MR fluid clutch apparatuses (not shown) connected to one or more rotary-to-rotary or a rotary-to-linear device in order to increase the controllability of the associated rotary-to-rotary or a rotary-to-linear device, as explained in FIG. 10.

Referring to FIG. 11, an alternative construction of the MR fluid actuator 11 is shown, in which a single MR fluid clutch apparatus 10 is connected to the speed reducer and where a second MR fluid clutch apparatus 10 is connected to another component. This construction may be useful for the second clutch apparatus to reduce the effect on the output of the viscous torque generated by the first MR fluid clutch apparatus 10 that is connected to the speed reducer, increasing the controllability of the system.

Figure 12:
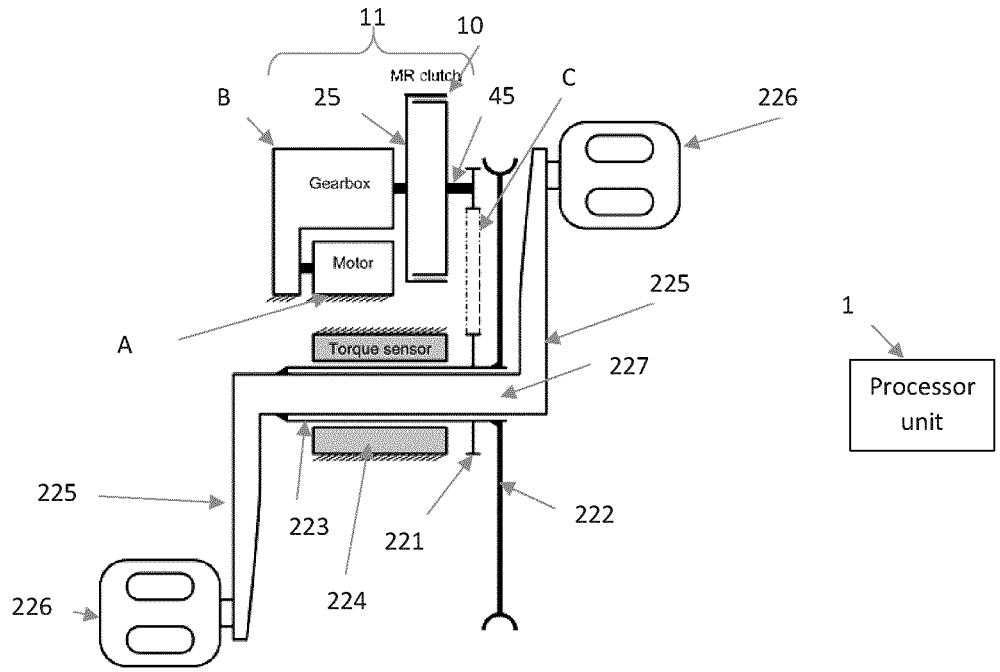
FIG. 12 is a schematic view of a human-hybrid powertrain with pedals input using a MR fluid actuator to modulate the power sent from a high impedance motor and speed reducer to a human powered pedal vehicle.
Figure 12:
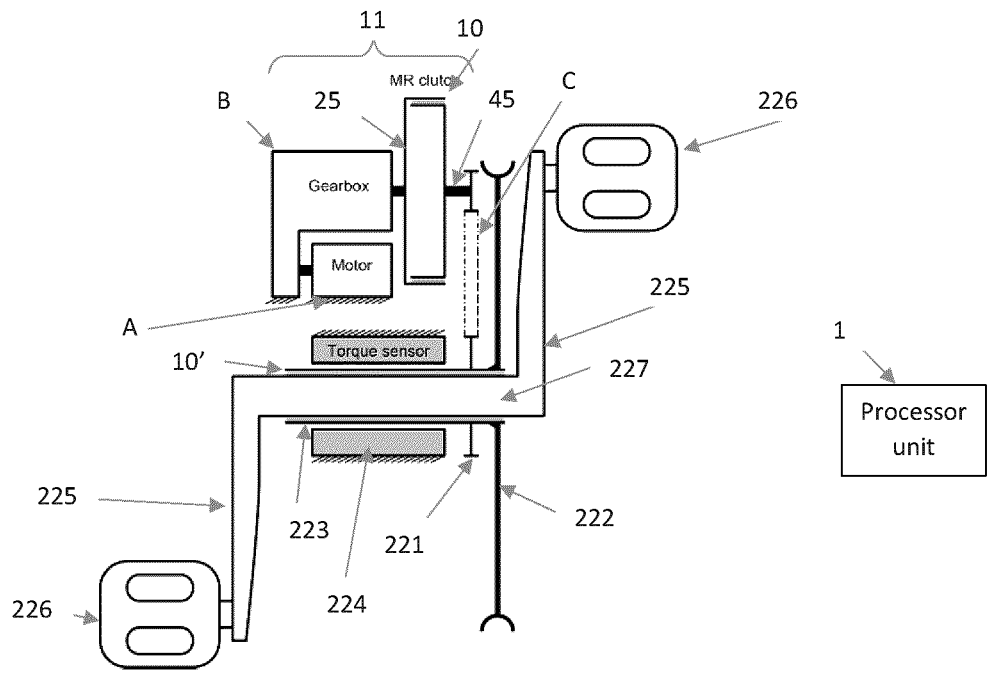
Figure 15:
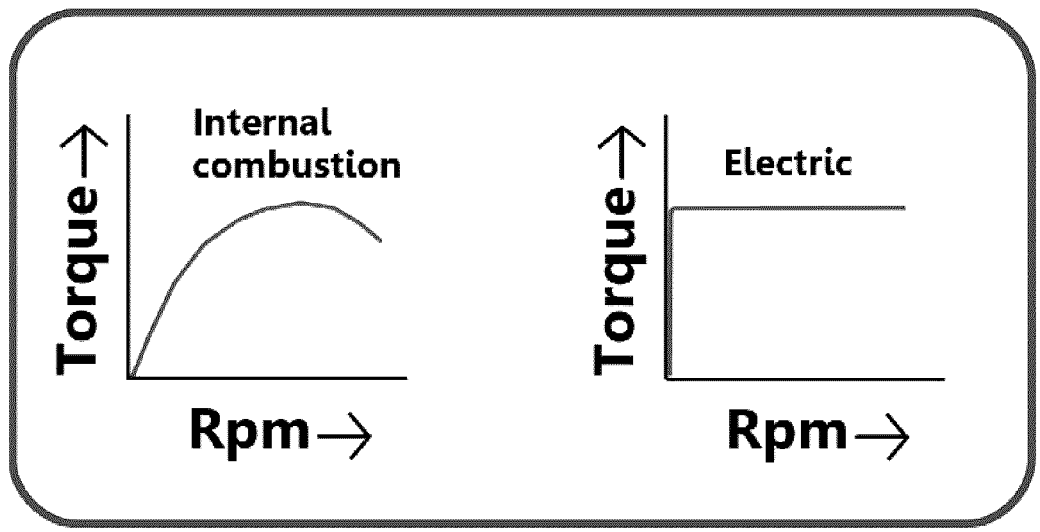
FIG. 15 shows graphics of torque VS RPM of combustion engine and electric motor.
Figure 16:
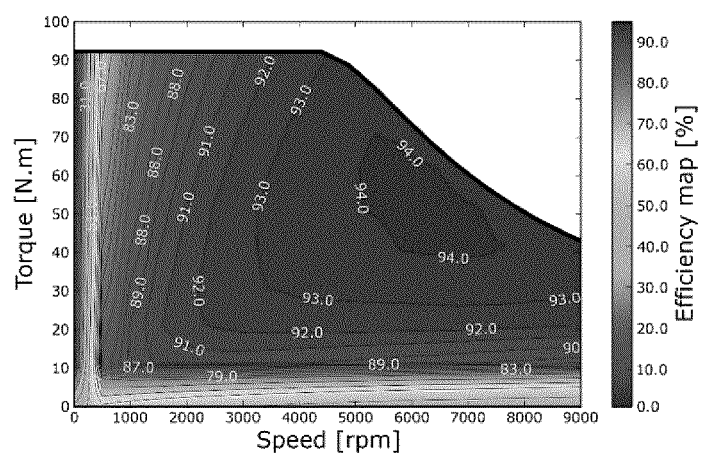
FIG. 16 shows a typical efficiency map of an electric motor according to its speed and torque capability.

Referring to FIG. 12, an integration of a MR fluid actuator unit 11 is shown in a human-hybrid powertrain, shown as being a crankset commonly found in bicycles, for example. The human hybrid powertrain is composed of the MR fluid actuator unit 11 that may include a power source A (e.g., a motor with its battery, fuel, etc), a speed reducer B, at least one of the MR fluid clutch apparatuses 10 as described in various embodiments above and an output device C or mechanism. In the shown example, the speed reducer B is connected to the MR fluid clutch apparatus 10 (e.g., to its cover 25) and the output shaft 45 is connected to the output device C, for example a rotary-to-rotary device. The rotary-to-rotary output device C may be connected to a gear 221 or like transmission component (e.g., belt and pulley, chain and sprocket, etc) used to transmit a torque to a shaft 223 from the MR fluid actuator unit 11. The shaft 223 is used to transmit the load to the spindle 227, whereby the shaft 223 and spindle 227 are integrally connected for concurrent rotation. Alternatively, the transmission component 221 could be connected directly to the spindle 227. The pedals 226 are connected to the respective crank arms 225 (a.k.a. crank arms or cranks) that may transmit force to the spindle 227. The spindle 227 is connected to shaft 223, allowing the force generated at both pedals to be measured by the torque sensor 224, but alternatively, the torque sensor 224 could measure the torque directly on the spindle 227. Speed and torque measured by the sensor 224 may be used as an input to control the torque and speed generated by the MR fluid actuator unit 11, providing motor A with speed input and MR fluid clutch apparatus 10 with torque output. The force transmitted by the human at pedals 226 can be transformed in torque on shaft 223 via the crank arms 225. Sensor 224 may be of the magnetostrictive kind. Hollow shaft 223 may be connected to an output gear 222, such as a chainring or sprocket. Output gear 222 may be then connected to a wheel, using a conventional chain. Moreover, the output gear 222 could be connected directly to the spindle 227 in an embodiment without the shaft 223. Other transmission components like belt or driving shaft may be used, only to name a few and output gear 222 need to be adapted. Gear 222 may also be connected to a multispeed transmission (not shown). A multispeed transmission (not shown) could also be located anywhere in between the output shaft 45 and wheel of the vehicle (not shown). In operation, the user may provide pedalling power to the vehicle wheel in order to accelerate the vehicle or in order to maintain its speed. In some conditions, the MR fluid actuator 11 may assist to provide additional power to the vehicle wheel in order to achieve greater acceleration or in order to be able to maintain a speed with less human pedalling input. The motor A may hence provide power to the vehicle. Depending on the motor type used, the torque available at low RPM (revolutions per minute) could be less than the torque available at higher RPM (see FIG. 15 with the torque VS RPM of an internal combustion engine). In this example, in order to maximise acceleration, it may be required to have the motor A turn at higher RPM than if it were connected in a direct drive fashion with the wheel through powertrain components, the MR fluid clutch apparatus 10 allowing slipping while controlling the torque transmitted to the vehicle. In this case, the torque available at the vehicle wheel may be maximized, hence the performance of the vehicle is enhanced. A similar behaviour may also happen in the case of an electric motor. In this case, it may be necessary to have the motor rotate at a minimum to operate outside a stall torque zone (near 0 RPM on the graphic of the electric motor torque VS RPM of FIG. 16) and thus allowing the motor to operate in a zone of acceptable efficiency (efficiency near stall torque is very low). In a human-hybrid powertrain, it is the sum of the human power and power transmitted by the MR fluid actuator unit 11 that may contribute to the vehicle performance.

In an alternative embodiment, it is contemplated to have the output shaft 45 of the MR fluid clutch apparatus 10 connected directly to the spindle 227, i.e., without the intervening hollow shaft 223. In a further construction, it is contemplated to have the output shaft 45 of the MR fluid clutch apparatus 10 used as spindle, with the MR fluid clutch apparatus 10 using its driven member as spindle.

Referring to FIG. 12', there is shown a hybrid-human powertrain construction similar to that of FIG. 12, but with an additional MR fluid clutch apparatus 10' installed between the hollow shaft 223 and the spindle 227. This hybrid-human powertrain may disconnect the human input force from the powertrain of the vehicle, allowing motor propulsion of the vehicle only, independently of the pedaling (and thus without causing a rotation of the crankset). In some applications, it is contemplated to replace the MR fluid clutch apparatus 10' by a one-way freewheel or another type of mechanical clutch in the bottom bracket. A one-way clutch may allow the MR fluid actuator unit 11 to provide torque to the wheel or components associated to the wheel, at higher revolution than the pedal cadence.

Figure 13:
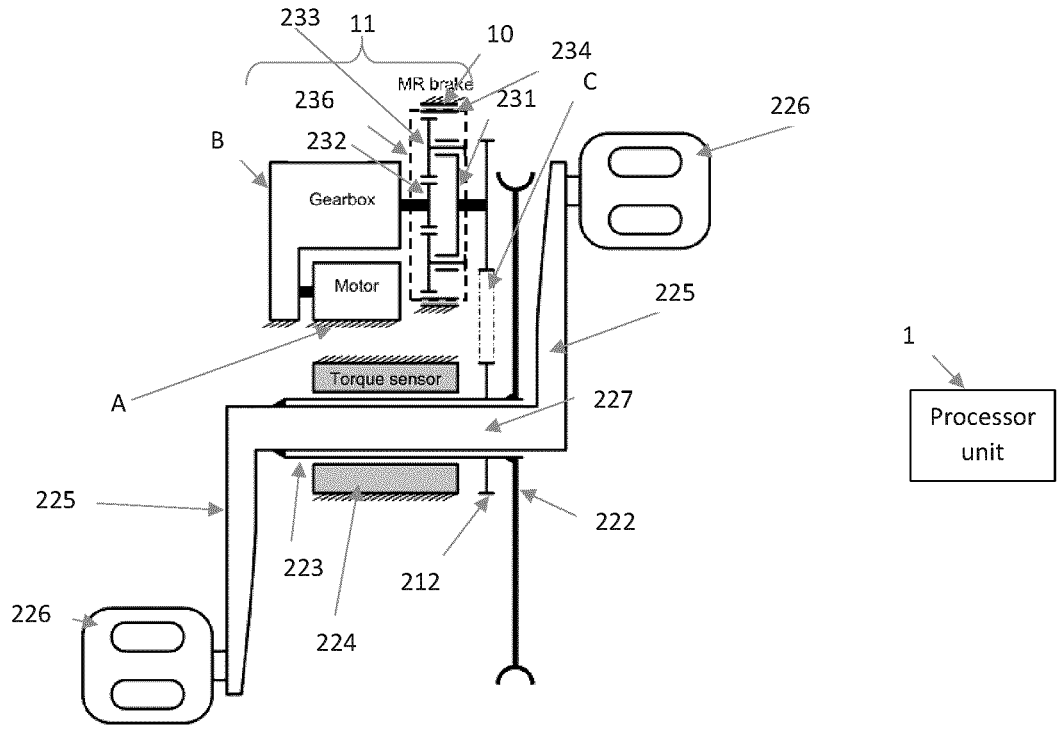
FIG. 13 is schematic view of a similar human-hybrid powertrain of FIG. 12 but with a planetary gear device part of the speed reducer and a MR fluid clutch used to brake one power port of the planet gear.
Figure 13:
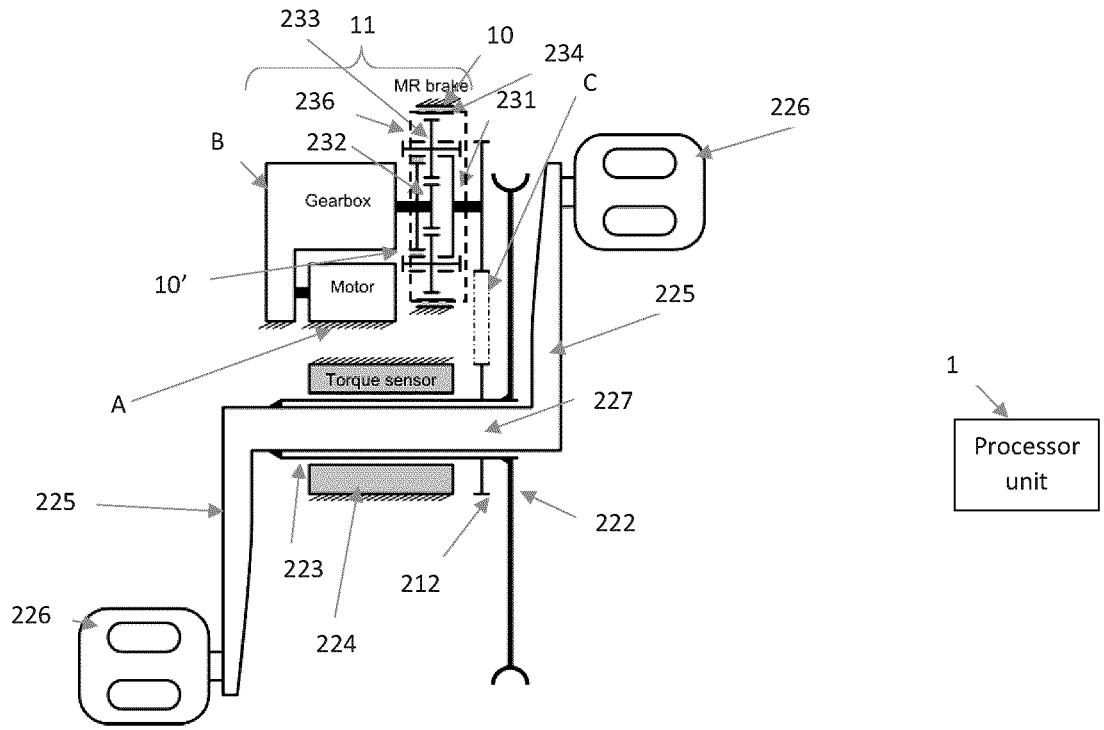

Referring to FIG. 13, another embodiment of a hybrid-human powertrain is shown and has components in common with the embodiment of FIG. 12, with like components bearing like reference numerals. The human-hybrid powertrain has a MR fluid actuator unit 11 that includes a power source A (e.g., a motor with battery, engine), a speed reducer B, a planetary gear device 236 acting as a rotary-to-rotary converter, at least one of the MR fluid clutch apparatuses 10 and an output device C or mechanism. In the shown example, the output device C is a rotary-to-rotary device. The speed reducer B is connected to the sun 232 of the planetary gear device 236. The sun 232 transmits torque to the planets 233 that, in turn, transmit movement to a planet carrier 231. The planets 233 turn in an internal ring gear 234 that acts as a rotor or is connected to a rotor of the MR fluid clutch apparatus 10. When the MR fluid clutch apparatus 10 is disengaged and allows the ring gear 234 to turn freely, the ability of the planetary gear device 236 to transmit torque to the planet carrier 231 is reduced, hence the torque that can be transmitted to the output C is also reduced. When the MR fluid clutch apparatus 10 is engaged, then the capability of the planet carrier 231 to transmit a load to the rotary-to-rotary output device C is increased. Torque transmission between output device C and output gear 222 is realised in similar fashion as that of the powertrain described in FIG. 12. By using a planetary gear device, the MR clutch apparatus 10 behaves like a brake and thus air gaps 101A and 101B shown in FIG. 6 may be removed and wireless power transfer or electric slip rings may also be unnecessary.

Referring to FIG. 13', there is shown a hybrid-human powertrain construction similar to that of FIG. 13, but with an additional MR fluid clutch 10' installed between sun 232 and planet carrier 231. This MR fluid clutch apparatus 10' may transmit torque directly from sun 232 to the planet carrier 231, not using the planetary gear device to reduce the speed ratio between the sun 232 and the planet carrier 231).

Referring to both FIGS. 12 and 13, the MR fluid clutch apparatus 10 may allow the MR fluid actuator unit 11 to limit the torque transmitted to the output C. This may allow a decoupling of the impedance generated by the motor A, and by gearbox B from the output C that may be connected to a human input mechanism. This arrangement may be useful where enhanced controllability and transparency are required for the human.

The illustrated configurations on FIGS. 12, 12', 13 and 13' are shown as samples of possible configurations. Other arrangements are considered in order to minimise the volume occupied by the components. One example of another arrangement may consist in having some of the parts, such as the MR fluid clutch apparatus 10, the planetary gear device 236 or the gearbox B, only to name a few, organised concentrically with the spindle 227. Also, principles shown on FIGS. 12' and 13' could be mixed in order to obtain other arrangements. The requested assistance controlled by the processor unit 1 may be based on various configurations, preset or controlled by the user of the vehicle: constant cadence, constant combined torque, constant speed, etc.

Figure 14:
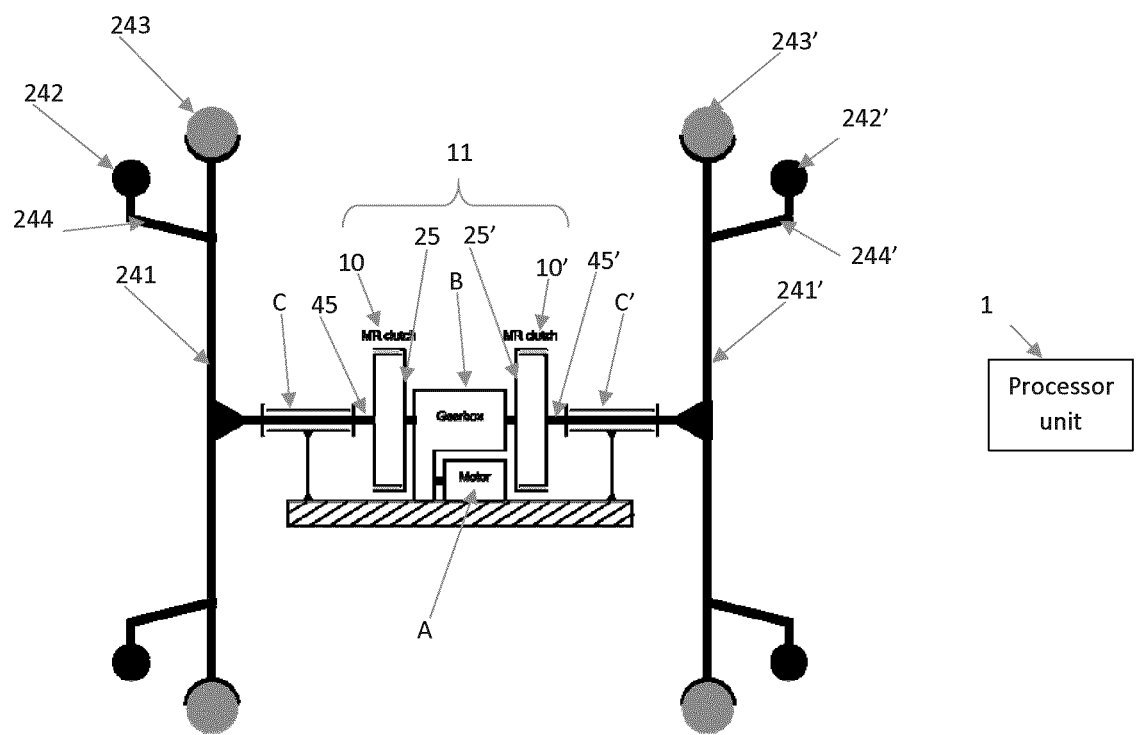
FIG. 14 is a schematic view of a human-hybrid powertrain with handle input using a MR fluid actuator similar to the one of FIG. 10" including two MR fluid clutches, actuating two different outputs.

Referring to FIG. 14, an integration of the MR fluid actuator unit 11 with two MR fluid clutch apparatuses 10 is shown in a human-hybrid powertrain that is used in a wheelchair receiving power from the arms and hands of a human. The human-hybrid powertrain may feature a power source A (e.g., a motor, an engine), a speed reducer B, two or more MR fluid clutches apparatuses 10 and 10' that can transmit power to two output devices C and C' or mechanism. The speed reducer B that may have 2 output shafts is connected to both the covers 25 and 25' of the MR fluid clutch 10 and 10' and the output shafts 45 and 45' are connected to two output devices C and C', rotary-to-rotary devices in the shown example. The rotary-to-rotary output devices C and C' may be connected to wheels 241 and 241'. Wheels 241 and 241' may receive input directly from human handling or via handles 242 and 242' are attached to the wheels. Tires 243 and 243' may be mounted on the wheels. Handles 242 and 242' may be attached to the wheels 241 and 241' by arms 244 and 244' that are equipped with torque sensors in order to measure the human input to the powertrain. In the shown example, the power transmitted to both wheels can be individually controlled in order to match the human input of both arms.

Examples provided above use rotary-to-rotary converters C, however, in some other human-hybrid powertrains, a rotary-to-linear converter may be used. Rotary-to-linear converter may be used where the output force of the powertrain may have a linear movement.

Figure 17:
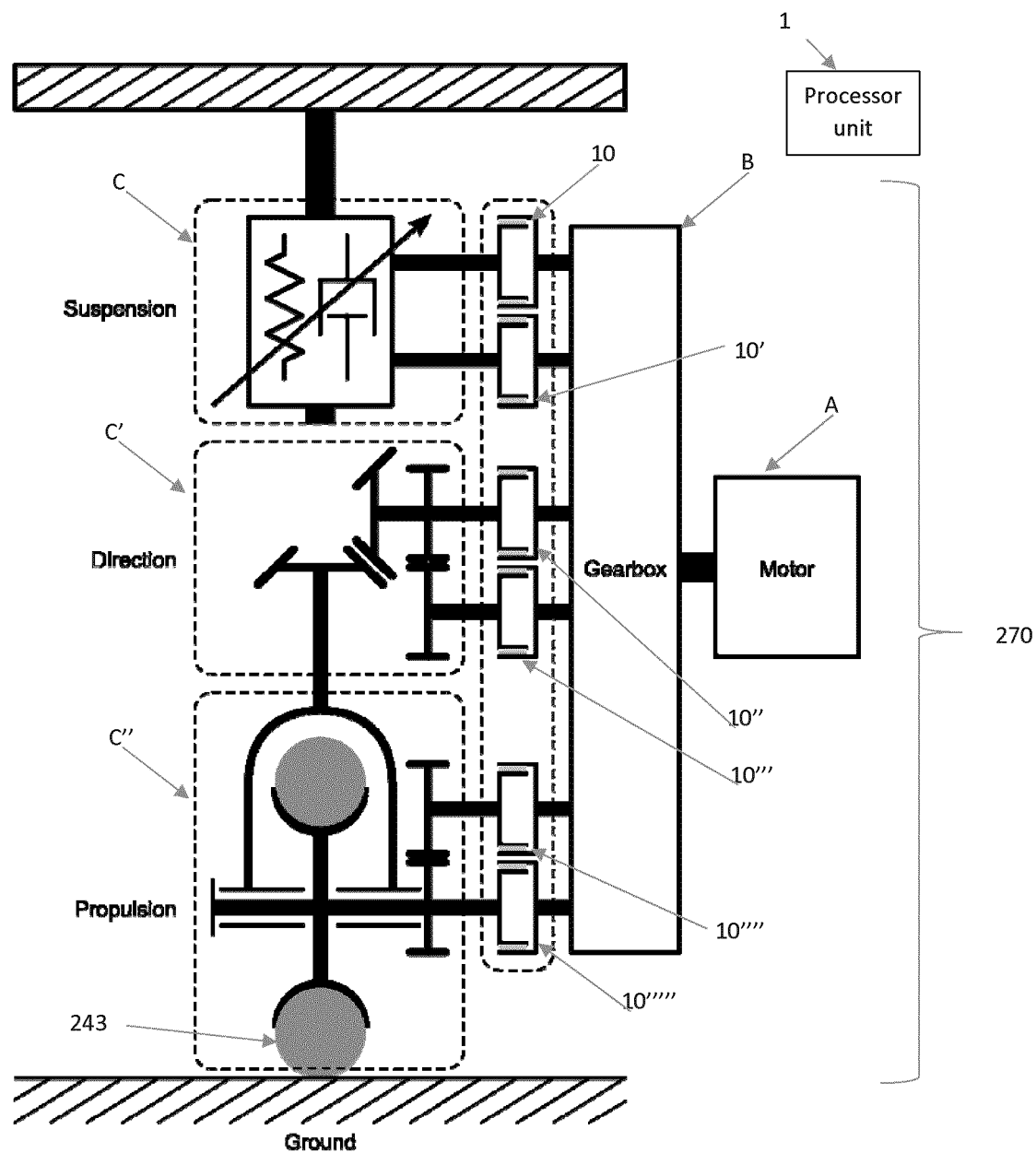
FIG. 17 is a schematic view of equipment wheel assembly that includes a plurality of MR fluid clutch apparatuses as shown in FIG. 1 in an assembly with multiple degrees of freedom.

Referring to FIG. 17, there is shown a wheel assembly 270 for a human-hybrid powertrain used in equipment, of the swivel type, or of a straight caster type (i.e., no swivel). For simplicity, the wheel assembly 270 shows a swivel type wheel assembly, but the U-shaped mount support the wheel may be mounted directly to a load-transporting equipment, without the swivel to change an orientation of the wheel.

The MR actuator unit 11 is composed of a power source A, a speed reducer B, at least one of the MR fluid clutch apparatuses 10 and an output device C or transmission, all of which are mounted to the swivel mount of the wheel assembly 270. In the shown example, the same power source A and speed reducer B provide force and power to three rotary-to-rotary and rotary-to-linear converters C, C' and C" using multiple MR fluid clutch apparatuses 10. The rotary-to-linear converter transmission C may provide active suspension ability to the wheel 243 (e.g., a caster) while the rotary-to-rotary converter transmission C' may provide direction to the wheel 243 by actuating rotations of the swivel mount, further while the rotary-to-rotary converter transmission C" may provide power to the wheel 243 in order to achieve rolling assistance. Other components may be present in the transmissions, such as bevel gears in the transmission C', and spur gears in the transmission C". This wheel assembly 270 may be used in a wheeled cart that is in maneuvered by human force. The wheel assembly 270 of FIG. 17 may include more or fewer rotary-to-rotary or rotary-to-linear converters. A simple version of this wheel assembly would include a single rotary-to-rotary converter C" in order to provide torque or power assistance to the human body with high controllability, due to the high bandwidth of the MR actuator unit 11. The use of pairs of MR fluid clutch apparatuses 10 in the various transmissions allows bi-directional assistance. The transmission may include any component between the MR fluid clutch apparatus 10 and the wheel, for transmission of an output to the wheel (gears, reduction devices, pulley and belt, tensionsing members, springs, etc).

Figure 18:
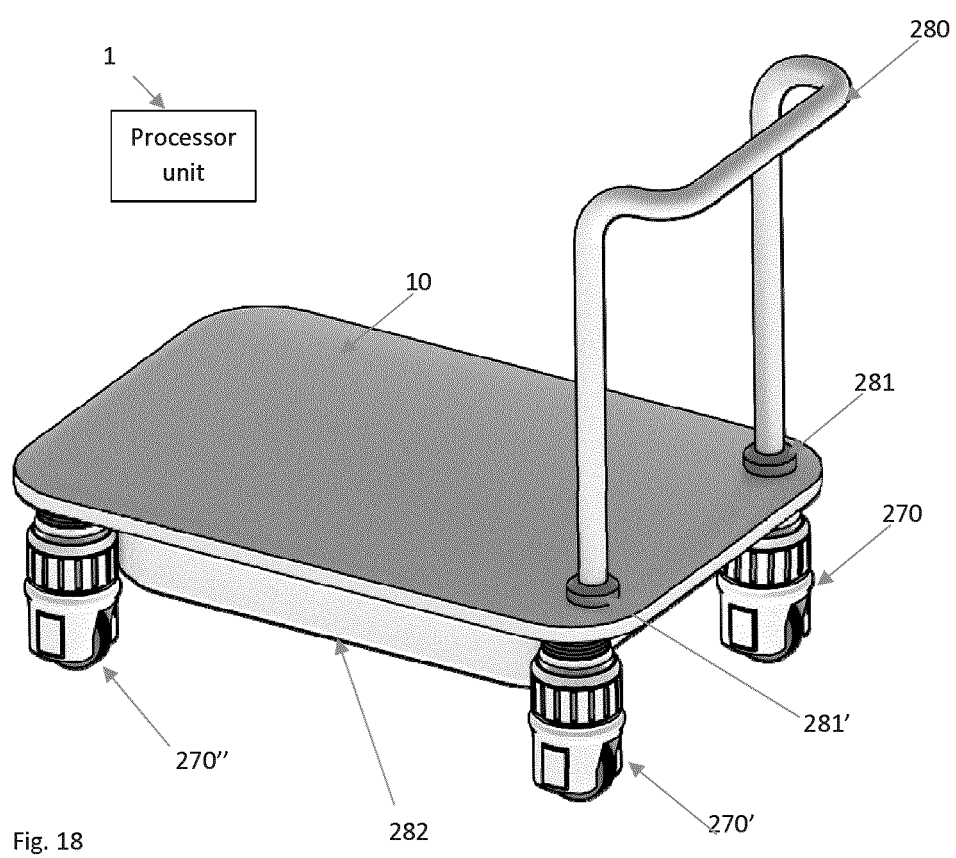
FIG. 18 is a schematic view of equipment including at least one of the wheel assemblies shown in FIG. 17.

Referring to FIG. 18, there is shown a human-hybrid powertrain equipment, or load-transporting apparatus, incorporating at least one of the wheel assemblies 270 of FIG. 17, the wheel assemblies 270 being of the swivel type. The platform 283 may be a cart or stroller be used to transport objects or humans, and may be manually controlled by the handle 280. Although it is shown as rolling on the ground, the load-transporting apparatus may be inverted such that the wheel assembly 270 is mounted to a ceiling rail, or wall rail. Hence, depending on the application, the load-transporting apparatus may have one wheel assembly or more, with three wheel assemblies (at least one of which is 270), when the load-transporting apparatus is used on the ground.

Sensors 281 and 281' may detect the vector (force and direction) of force generated by the user and may provide information to the processor unit 1 associated with the MR actuator unit 11 in order to operate one or more of the multiple wheel assemblies 270. The information is hence related to a movement of the load-transporting apparatus, whether it be as a speed, a displacement, an acceleration, a force, etc. With high-bandwidth controllability, the wheel assembly(ies) 270 may provide assistance in the direction of the input provided by sensor 281 and 281' in order to limit the human force required to move the equipment. The controllability of the device, because of the high bandwidth, may feel more natural than with a mechanical system with low bandwidth. It is to be noted that a single sensor or other types of sensors may be used (rotary encoders, inertial sensors, strain gauges, etc). Also, motors A (not shown) may receive power from a battery 282 located under the platform 283. For a device incorporating more than one wheel assembly 270, it is possible to have only one motor A, distributing power and torque to each gearbox or only one motor A and only one gearbox B distributing power and torque to each rotary-to-rotary or rotary-to-linear converter. It is considered to provide a load-transporting apparatus as in FIG. 19 with wheels of the wheel assembly 270 driven in opposite directions, for one wheel to drive the load-transportation apparatus in a first direction (e.g. forward), for another wheel to drive the load-transportation apparatus in a second direction (e.g., rearward), and for a combination of the driving of the wheels to drive the load-transportation apparatus in another direction (e.g., rotation, etc).

Figure 19:
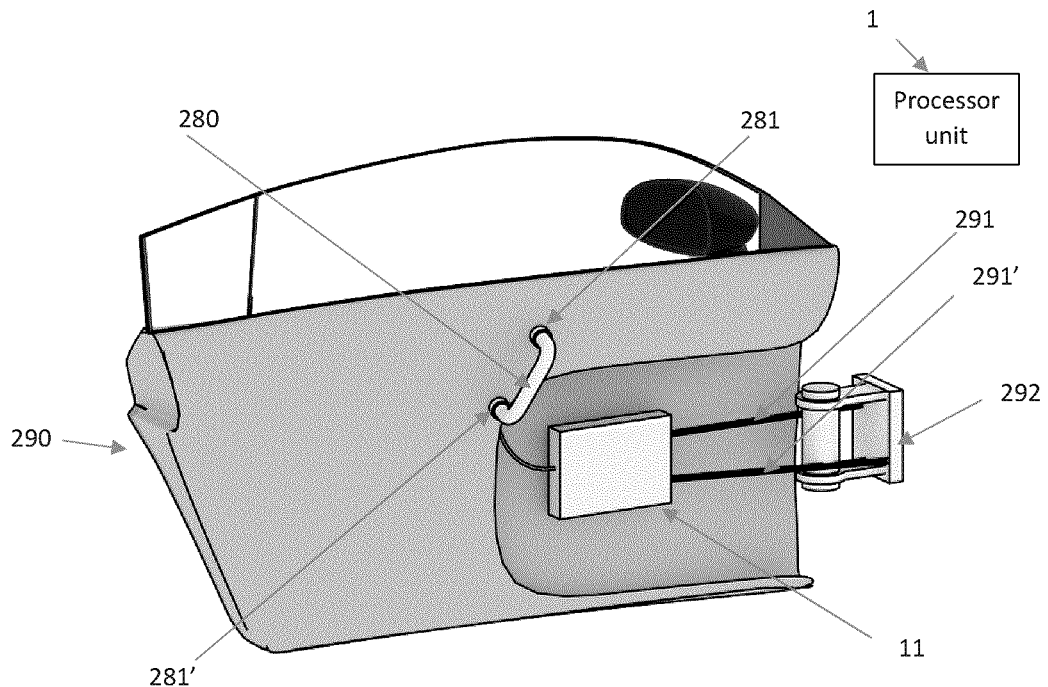
FIG. 19 is a schematic view of a vehicle door including a cable connected human-hybrid powertrain used to provide assistance for door opening.

Referring to FIG. 19 there is shown an integration of the MR fluid actuator unit 11 with two MR fluid clutch apparatuses (not shown, but of the type shown at 10 herein) in a human-hybrid powertrain that is used on a vehicle door 290 receiving power from the arms and hands of a human via the handle 280, or on other parts of the door 290 (e.g., from the exterior handle (not shown). Sensors 281 and 281' may detect the vector (force and/or direction) of force generated by the user on the handle 280 or any other surface thereof, or may detect a position of the door, and may provide information to the processor unit 1 indicative of the position, force, speed, momentum, etc of the door. The processor unit 1 is associated with the MR fluid actuator unit 11 in order to operate the MR fluid actuator unit 11. With high bandwidth controllability, the MR fluid actuator unit 11 may provide assistance in the direction of the input provided by sensor 281 and 281' in order to limit the human force required to move the door. The controllability of the device, because of the high bandwidth, may feel more natural than assistance provided by a mechanical system with low bandwidth. It is to be noted that a single sensor or other types of sensors may be used. For example, a proximity sensor may be used to control the distance between the human hand and part of the door 290. Also, a position sensor may be used to control the amount of assistance to provide in relation to position of the door. The position may be used to control the amount of assistance to provide to compensate for gravity or moving resistance in relation to speed or acceleration of the door (i.e. partially compensate for inertia). Position control may be particularly useful if the door is not pivoting on vertical axis and if the geometry of the door change the force required by the user to manipulate it. It is also noted that the door 290 can be equipped with multiple operation points (i.e. multiple handled and associated sensors). In the illustration, the force is transmitted by using cables 291 and 291' working in an antagonist manner, as an example, considering that other mechanisms are considered and may be used. Cables 291 and 291' are attached to a position on a fixed part of the frame 292 that allows each cable to exert a rotational force on the door assembly in a different direction, allowing the antagonistic control of the door 290. MR fluid actuator unit 11 may exert a force directly on the door or on a mechanism that is connected to the door. Although a vehicle door is illustrated in FIG. 19, other type of doors or devices may benefit from the described mechanism. Only to name a few: industrial equipment door (i.e: plastic injection machine door, machining center door, etc. . . . ), household equipment doors (i.e. freezer, refrigerator, washing machine, etc. . . . ), garage door, patio sliding door. Although FIG. 19 shows a MR fluid actuator unit 11 described as featuring two MR fluid clutches apparatuses 10, it is contemplated to have a single MR fluid clutch apparatus 10, with a biasing member or like force applying member providing and antagonistic force to enable a bi-directional output for the MR fluid clutch actuator unit 11. In some cases, gravity may be used as a biasing member. In order to increase the safety of the human-hybrid powertrain that is applying a force on the door or gate, additional sensors providing information about the environment may be used. For example, proximity sensor, vision sensor, anti-pinch sensor, may be used to decrease the chances of the door, gate or other device to enter in collision with objects or humans that may be placed on the trajectory of the door, gate or device.

Figure 20:
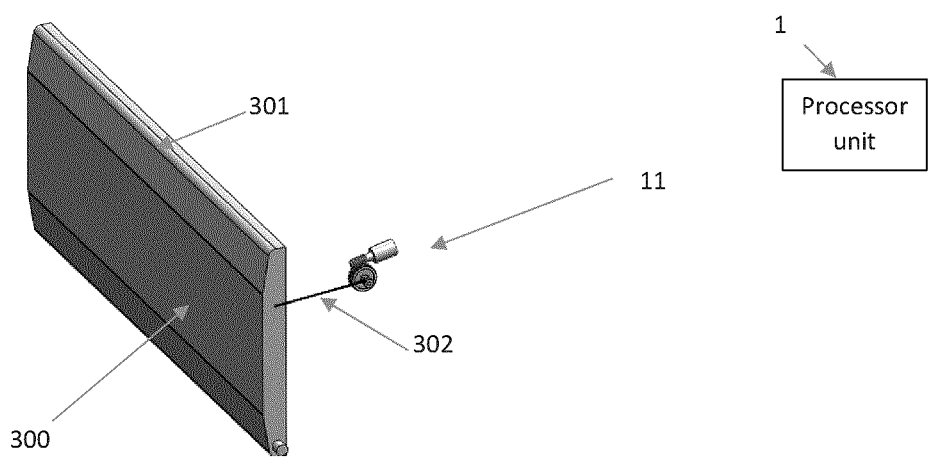
FIG. 20 is a schematic view of a vehicle tail gate including a human-hybrid powertrain used to provide assistance for door operation with the powertrain connected directly to the gate.
Figure 20:
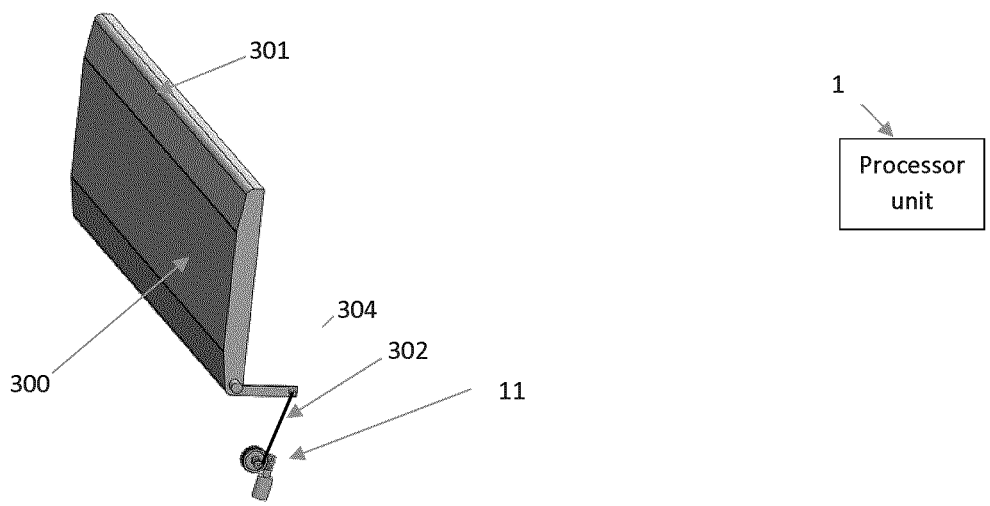

Referring to FIG. 20, there is shown an integration of the MR fluid actuator unit 11 with one MR fluid clutch apparatus (not shown, but of the type shown at 10' herein) in a human-hybrid powertrain that is used on a vehicle gate 300 receiving power from the arms and hands of a human. The MR fluid actuator unit 11 is mounted on a vehicle frame or structure (not illustrated). Sensor 301 (here illustrated as strip force sensor) may detect the vector (force and/or direction) of force generated by the user on the gate 300 and may provide information in order to operate the MR fluid actuator unit 11. With high bandwidth controllability, the MR fluid actuator unit 11 may provide assistance in the direction of the input provided by sensor 301 in order to limit the human force required to move the gate. The controllability of the device, because of the high bandwidth, may feel more natural than assistance provided by a mechanical system with low bandwidth. It is to be noted that a single sensor or other types of sensors may be used. It is also noted that the gate 300 can be equipped with multiple operation points (i.e. multiple handles or sensors). In the illustration, the force is transmitted by using a vehicle interface in the form of cable 302 working in an antagonist manner in conjunction of gravity or biasing member, as an example, considering that other mechanisms are considered and may be used. Cable 302 is attached to a position on a fixed part of the gate 300 that allows the cable 302 to exert a rotational force on the gate assembly in one direction, allowing the antagonistic control of the gate by using the gravity or other biasing member, with the other end of the cable 302 attached to a wheel 312 on the output of the MR fluid clutch apparatus 10. The wheel 312 may include a pulley as when a cable is used, but may also include a sprocket or chainring, cogged wheel, gear, based on the nature of the transmission component or tensioning member (e.g., chain, cable, belt, timing belt, etc). The vehicle interface hence includes the various components between the MR fluid clutch apparatus 10 and the door or structure, including non-exhaustively such tensioning members, additional reduction mechanism, gear mechanisms, pulleys, etc. The MR fluid actuator unit 11 may exert a force directly on the gate 300 or on a mechanism that is connected to the gate. Although a vehicle gate is illustrated in FIG. 20, other type of gates may benefit from the described mechanism. Only to name a few: pickup truck end gate, vehicle tail gate, trailer gate, tilt gate, garage gate. It is to be noted that the actuator 11 may be installed on the gate 300 while the cable attached to a fixed part of the vehicle frame (not illustrated). In the case of a vehicle gate, as in FIG. 20, the MR fluid actuator unit 11 may serve as a gravity aid to substantially reduce the force necessary to move the gate 300 to a closed position. In such a case, the sensor 301 may be a rotary encoder noting the inclination of the gate 300, such that the force necessary to compensate for gravity may be adjusted as a function of the inclination. In such an embodiment, there may be a single MR fluid actuator unit 11 to help raise the gate 300, and if the movement is stopped at some inclination before closing, the friction in the various components of the MR fluid actuator unit 11 may be sufficient to keep the gate 300 in its current inclination, or limit the speed at which it pivots down to its fully opened position.

Referring to FIG. 20' there is shown an integration of a MR fluid actuator unit 11 similar to the one of FIG. 20 with the difference that the action of cable 302 is done on a mechanism attached to the gate 300. The mechanism illustrated is a lever 304 but other mechanisms are considered.

Figure 21:
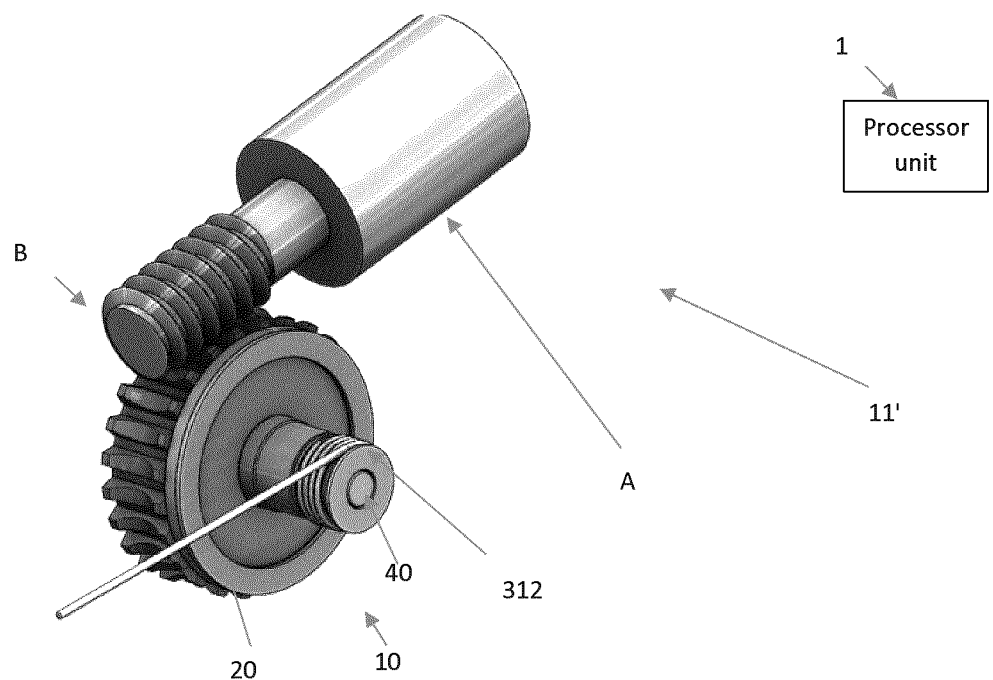
FIG. 21 is a schematic detailed view of a vehicle tail gate powertrain including a single MR clutch apparatus in an angled arrangement.
Figure 21:
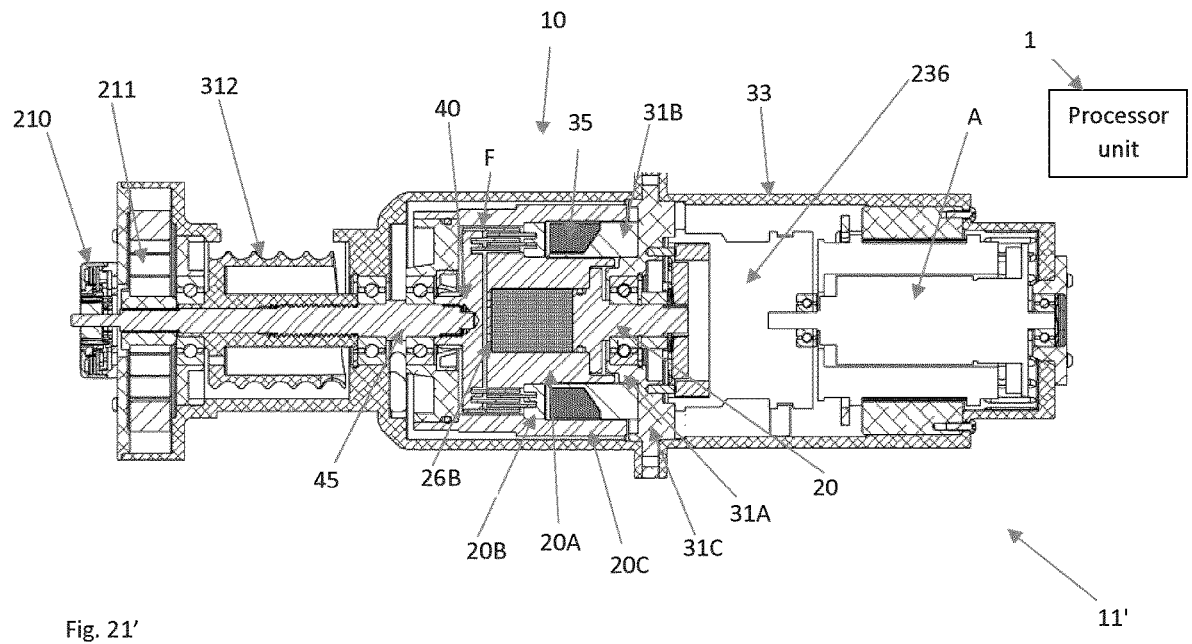

Referring to FIG. 21 there is shown one MR fluid actuator 11' that may be used in FIGS. 20 and 20'. A motor A is connected to a speed reducer B (e.g. a worm gear is illustrated) that is connected to the input 20 of a MR fluid clutch apparatus 10 used to transmit torque to the output 40 of the MR fluid clutch apparatus 10. The output 40 is connected to a pulley 312 where a cable may be attached. A cable is illustrated here but other types of tensioning devices may be used (i.e. chain, belt, hydraulic piston, . . . ).

Referring to FIG. 21', there is shown an integration of a MR fluid actuator unit 11' that may be used in FIGS. 20 and 20' but with an inline arrangement instead of an angled arrangement. In this arrangement, instead of a worm gear speed reducer B as in FIG. 20, the speed reducer B may be of planetary gear device, as in FIG. 13. If a planetary gear device is used, the output shaft of motor A is connected to the sun 232 (FIG. 13) of the planetary gear device 236. The sun 232 transmits torque to the planets 233 (FIG. 13) that, in turn, transmit movement to a planet carrier 231 (FIG. 13). The planets 233 turn in an internal ring gear 234 (FIG. 13) and the planet carrier 231 hence turns at a lower speed. Planet carrier 231 (FIG. 13) may be connected to the input member 20 of the MR fluid clutch apparatus 10 or connected to the sun of a second stage of planetary gear. The described embodiment features the output shaft of motor A connected to the sun 232 and the planet carrier 231 connected to the input member 20 of the MR fluid clutch apparatus 10, but other arrangements of a planetary gear device may be considered. The function is similar to the MR fluid actuator unit of FIG. 21. In the described embodiment, a sensor 210 is present to provide information about the angular position of the pulley 312 and a recoil spring 211 is present in order to maintain tension in the cable 302 (not illustrated) if the MR fluid actuator unit 11' is not powered. The outer face 33 is connected to the radial wall 31C and then to 31B and 31A, and is thus the fixed component of the MR fluid clutch apparatus 10 relative to the structure.

Figure 22:
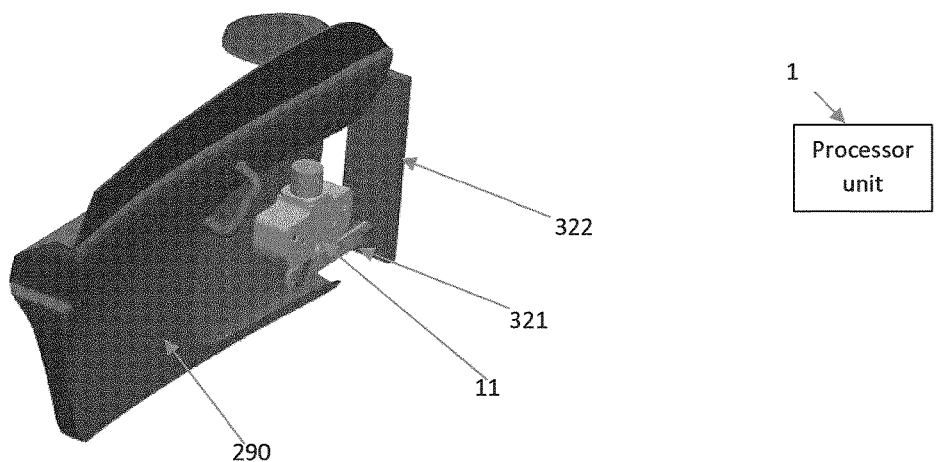
FIG. 22 is a schematic view of a vehicle door including linkage connected to a human-hybrid powertrain used to provide assistance for door opening.

Referring to FIG. 22, there is shown an integration of a MR fluid actuator unit 11 with two MR fluid clutch apparatuses (not shown, but of the type shown at 10 herein) in a human-hybrid powertrain similar to the one of FIG. 19 but using a vehicle interface in the form of mechanism 321 between the door 290 and the frame 322 instead of cables. The operation is similar and presents similar advantages as the embodiment of FIG. 19.

Figure 23:
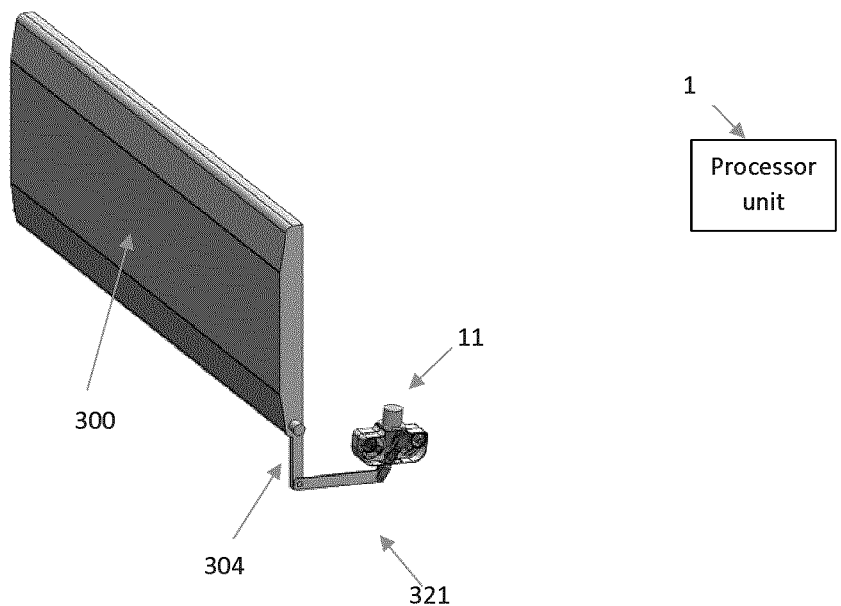
FIG. 23 is a schematic view of a vehicle tail gate including a linkage connected human-hybrid powertrain used to provide assistance for gate operation.

Referring to FIG. 23, there is shown the integration of a MR fluid actuator unit 11 similar to the one of FIG. 22 but on a gate 300. To the difference of the MR fluid actuator of FIGS. 20 and 20', the MR fluid actuator 11 of FIG. 23 also uses mechanism 321 instead of a cable between the gate 300 and the actuator 11. The operation is similar to that of FIGS. 20 and 20' but with improved controlled since the MR fluid actuator unit 11 is composed of two MR fluid clutches apparatuses 10 (not illustrated) and hence may provide antagonistic forces on the gate, as opposed to relying solely on a biasing force (member or gravity). In FIG. 23, the lever may be connected to the gate 300 using a mechanism to multiply the movement so the lever 304 does not move by 90° while the gate 300 is moving by 90°.

Figure 24:
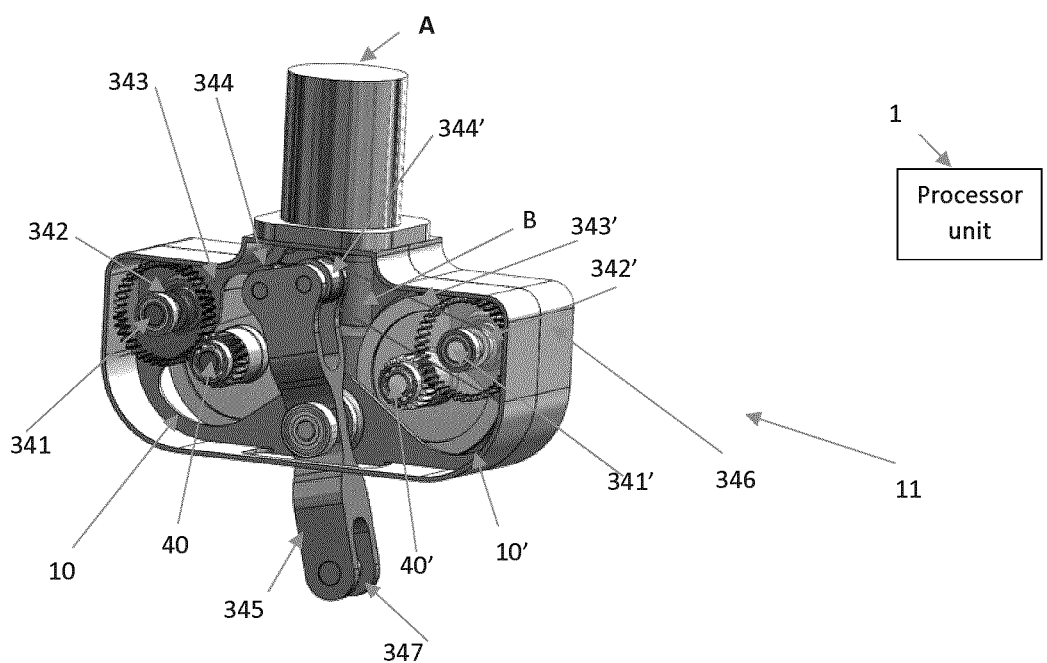
FIG. 24 is a schematic detailed view of a vehicle door or tail gate powertrain including a two MR clutch apparatus.
Figure 24:
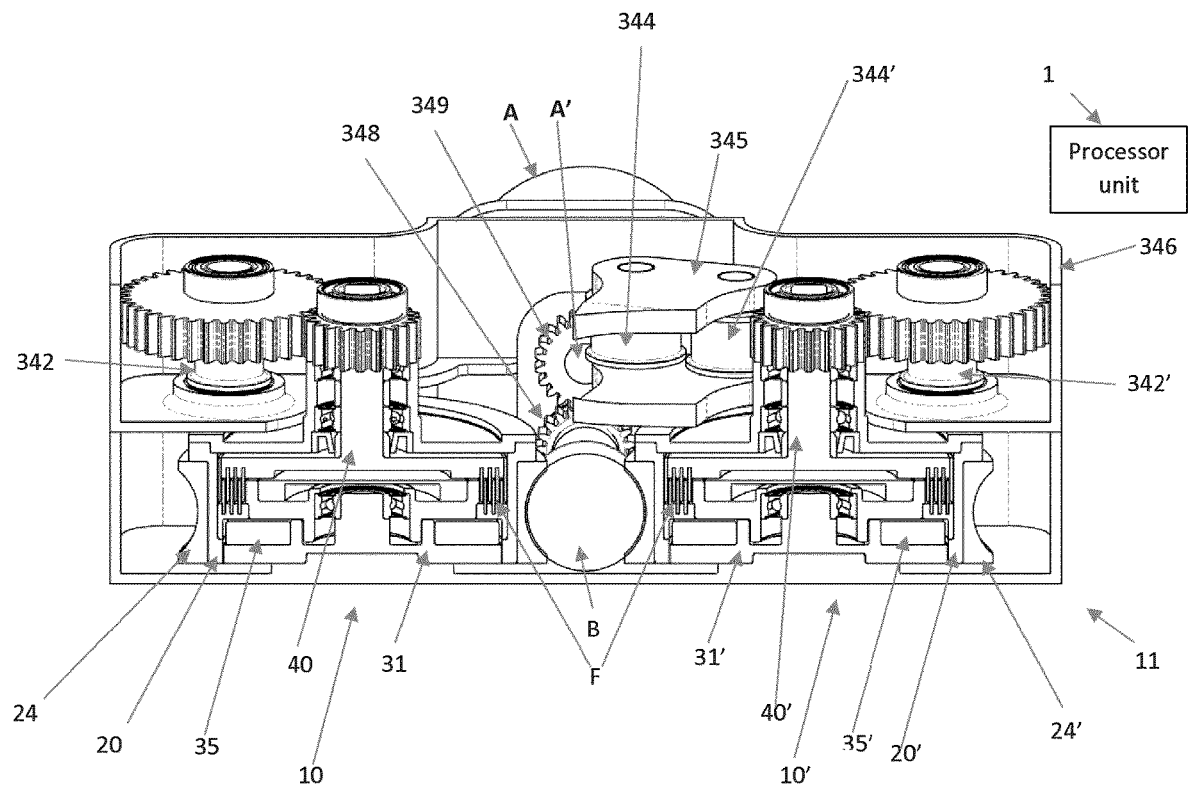

Referring to FIG. 24, there is shown an MR fluid actuator 11 that is part of the mechanism 321 used in the embodiments of FIGS. 22 and 23. A motor A is connected to a speed reducer B (e.g., a worm gear as illustrated) that is connected to the inputs of MR fluid clutch apparatus 10 and 10' used to transmit torque to the output 40 and 40' of the MR fluid clutch apparatus 10 and 10'. In the illustrated embodiment, the inputs of the MR fluid clutch apparatus 10 and 10' are worm wheels on their outer periphery meshed with the worm gear. The outputs 40 and 40' are connected to rotary-to-rotary converter systems (e.g., a gear system illustrated here) that is attached to pulleys 342 and 342' where cables 343 and 343' may be attached. Cable 343 and 343' are illustrated here but other types of tensioning devices may be used (i.e. chain, belt, hydraulic piston, . . . ). The cable may then be routed to pulleys 344 and 344' mounted on a lever 345. In this embodiment, there is illustrated a 2 step rotary-to-rotary converter but in other configurations, the cable could be attached directly to the lever 345 from a pulley mounted directly to outputs 40 and 40' (similar to FIG. 21) or directly from the pulley 342 and 342' to the lever 345. Other type of rotary-to-rotary or rotary-to-linear converters may be used. Also, one MR fluid clutch apparatus may be replaced by a biasing member. In the MR fluid actuator 11 of FIG. 24, the output force is generated on the lever 345 by the force transmitted by cables 343 and 343' working in an antagonist manner, as an example, considering that other mechanisms are considered and may be used. Cables 343 and 343' are attached to a position on a fixed part of the frame 346 that allows each cable to exert a rotational force on the lever 345 in a different direction, allowing the antagonistic control of the door or gate using the operating pivot 347 that is connected to mechanism 321 (not illustrated).

Referring to FIG. 24', there is shown a partial cut-out detailed view of the MR fluid actuator unit of FIG. 24. The motor output A' is connected to a pinion 349 that may have a reduction ratio with another gear 348. Gear 348 is connected to a speed reducer B (e.g., a worm gear as illustrated) that is connected to the pulley portion 24 and 24'. The reduction mechanism between the motor A and the input members 20 and 20' may be selected to obtain the desired speed for the output members 40 and 40' as a function of the speed of the motor A. The faster the motor A may spin (in RPM) in relation to the required output member 40 and 40' speed (in RPM), the higher the combined speed reduction ratio obtained by the mechanical devices may be. It may be desired to maintain an acceptable motor A size to have the motor of a type that spins at high RPM (i.e. motor that spins over 3000 RPM). The configuration of the power source orientation in relation to the orientation of the output may also affect the configuration of the speed reducer B. In FIG. 24', Pulley portion 24 may be a worm wheel for cooperation with worm gear B. Worm wheels 24 and 24' may turn in opposite directions and are connected to input members 20 and 20' respectively. Torque is transmitted to the output members 40 and 40' by energising coils 35 and 35' respectively.

Figure 25:
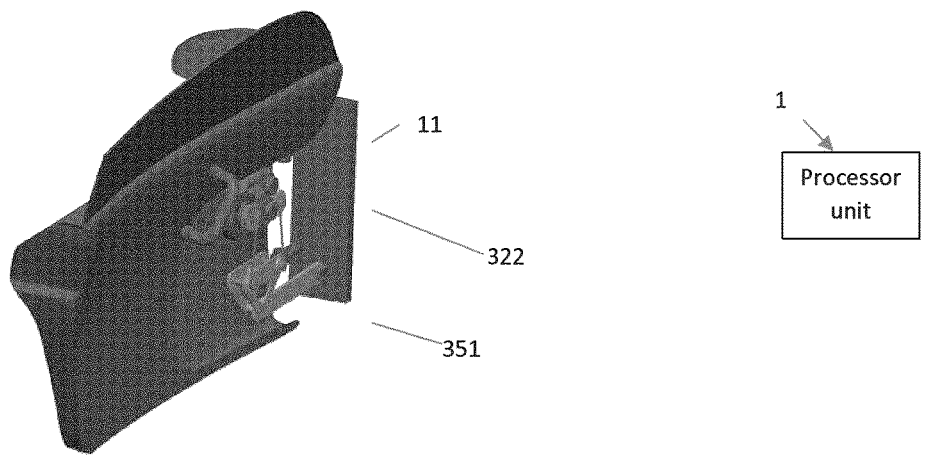
FIG. 25 is a schematic view of a vehicle door including cable connected to linkage human-hybrid powertrain used to provide assistance for door opening.
Figure 26:
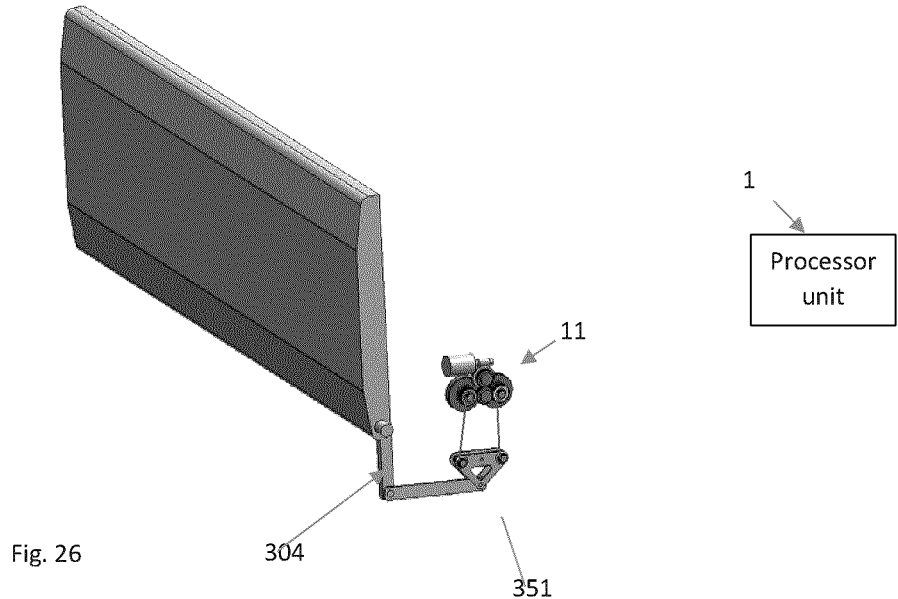
FIG. 26 is a schematic view of a vehicle tail gate including a cable connected to linkage human-hybrid powertrain used to provide assistance for door movement.

Referring to FIG. 25, there is shown an embodiment of the MR fluid actuator unit 11 with two MR fluid clutch apparatuses (not shown, but of the type shown at 10 herein) in a human-hybrid powertrain similar to the embodiments of FIGS. 19 and 22 but using a vehicle interface in the form of a mechanism 351 operated by cable that may come from the MR fluid actuator 11. The mechanism 351 transmits forces in both directions between the door 290 and the frame 322. Operation is similar to the MR fluid actuator unit 11 of FIG. 19. Referring to FIG. 26, there is shown the integration of the MR fluid actuator unit 11 in the mechanism 351 similar to the one of FIG. 25 but on a gate 300.

Figure 27:
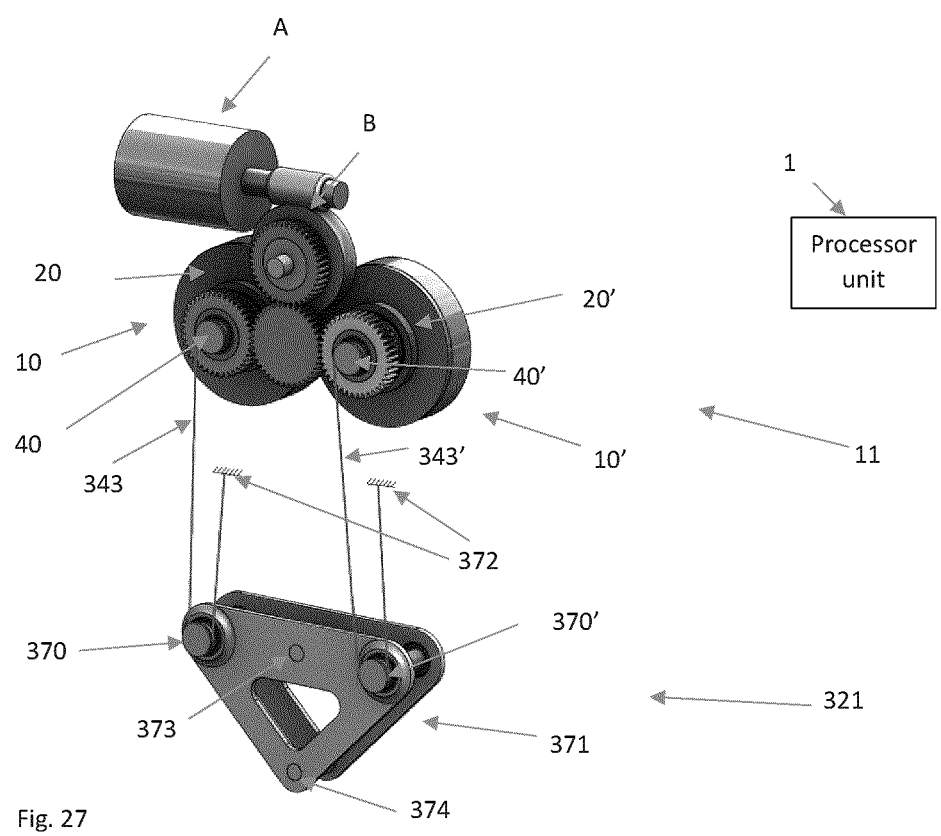
FIG. 27 is a schematic detailed view of a vehicle door or tail gate cable connected to linkage powertrain including two MR clutch apparatuses.

Referring to FIG. 27, there is show a more detailed view of the embodiment of the mechanism 351 that may be used in FIGS. 25 and 26. A motor A is connected to a speed reducer B (e.g. a worm gear is illustrated) that is connected to a set of gear that distributes power to the input 20 and 20' of MR fluid clutch apparatus 10 and 10' used to transmit torque to the output 40 and 40' of the MR fluid clutch apparatus 10 and 10'. In FIG. 27, the outputs 40 and 40' also play the role of pulley where cables 343 and 343' may be attached but the same may be achieved by using separated parts (output and pulley) attached together. Cable 343 and 343' are illustrated here but other types of tensioning devices may be used (i.e. chain, belt, hydraulic piston, etc. . . . ). The cables 343 and 343' may be then routed to pulleys 370 and 370' mounted on a lever 371 that is located remotely from MR fluid actuator unit 11. In this embodiment there is illustrated a single step rotary-to-rotary converter but in other configurations, the cables 343 and 343' could be attached directly to the lever 371 from pulleys mounted directly in outputs 40 and 40". Other type of rotary-to-rotary or rotary-to-linear converters may be used. Again in this configuration, one MR fluid clutch apparatus 10 may be replaced by a biasing force or member. In the MR fluid actuator 11 of FIG. 27, the output force is generated on the lever 371 by the force transmitted by cables 343 and 343' working in an antagonist manner when the lever 371 rotates around a pivot 373 that is mounted on a fixed frame (not illustrated), as an example, considering that other mechanisms are considered and may be used. Cables 343 and 343' are attached to a position on a fixed part of the frame 372 that allows each cable to exert a rotational force on the lever 371 in a different direction, allowing the antagonistic control of the door attached to the mounting point 374 of the mechanism 371. The mounting point 374 may be pivotally connected to a linkage as in FIG. 25, the linkage then connected to the door or structure of the vehicle.

Figure 28:
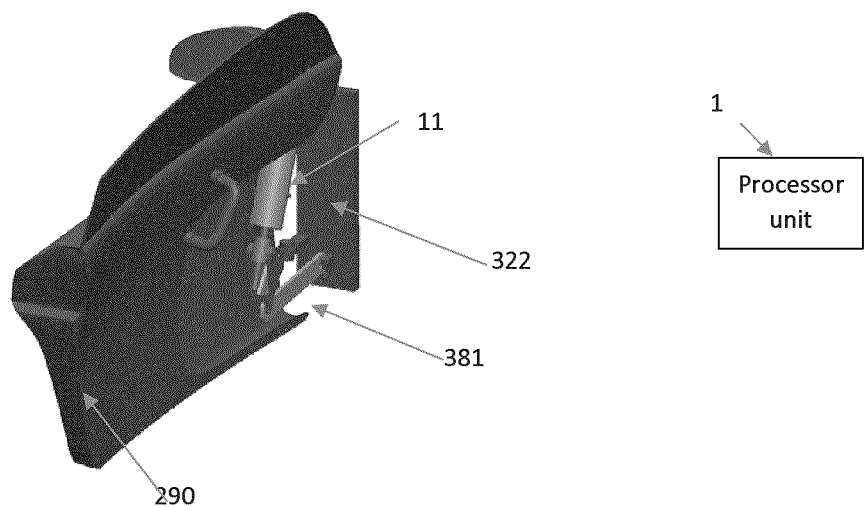
FIG. 28 is a schematic view of a vehicle door including linear linkage connected human-hybrid powertrain used to provide assistance for door opening.

Referring to FIG. 28, there is shown an integration of the MR fluid actuator unit 11 with two MR fluid clutch apparatuses (not shown, but of the type shown at 10 herein) in a human-hybrid powertrain similar to the one of FIGS. 19, 22 and 25 but using a rotary-to-linear converter instead of a rotary-to-rotary converter, as part of mechanism 381. The MR fluid actuator 11 is attached to the door 290 a remainder of the mechanism 381 interfaces the actuator unit 11 to the frame 322. Operation is again similar to the that of FIG. 19.

Figure 29:
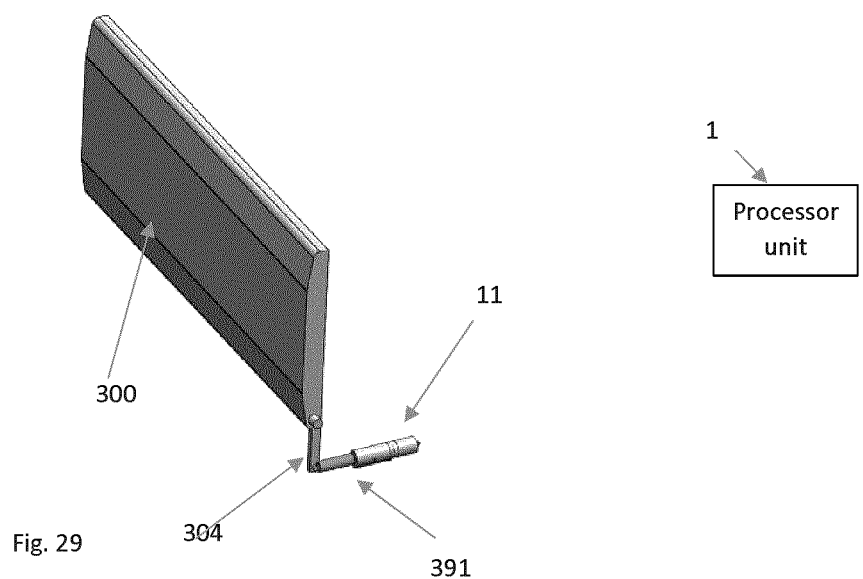
FIG. 29 is a schematic view of a vehicle tail gate including a linear linkage connected human-hybrid powertrain used to provide assistance for gate operation.

Referring to FIG. 29, there is shown the integration of the MR fluid actuator unit 11 in the mechanism 381 as in FIG. 28 but on a gate 300. The MR fluid actuator unit 11 in the mechanism 381 of FIG. 29 uses a rotary-to-linear that links the actuator unit 11 to a lever 304 connected to the gate 300.

Figure 30:
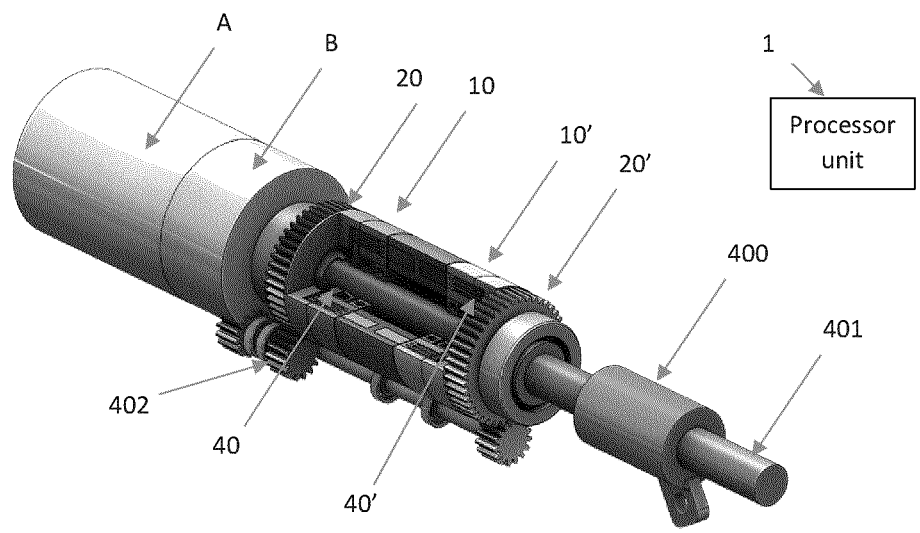
FIG. 30 is a schematic detailed view of a vehicle door or tail gate linear connected to linkage powertrain including a two MR clutch apparatus.

Referring to FIG. 30, there is show a more detailed view of a possible embodiment that may be used in FIGS. 28 and 29. A motor A is connected to a speed reducer B (i.e. a planet gear is illustrated here) that is connected to a set of gears 402 that distribute power to the inputs 20 and 20' or MR fluid clutch apparatuses 10 and 10' while reversing the direction of rotation of 20' in relation to 20. Input 20 and 20' rotate in opposite directions. MR fluid clutch apparatus 10 and 10' are used to transmit torque to the output 40 and 40 that are both connected to a common screw 401 (e.g., ball screw mechanism, acme screw, etc). The direction of rotation of the screw 401 may be controlled with high bandwidth by the MR fluid clutch apparatuses 10 and 10'. Screw 401 drives a nut 400 in order to achieve rotary-to-linear conversion. In order to limit the friction between the screw 401 and the nut 400, the screw and nut may be of ball type.

In the configurations of FIGS. 19 to 30, the assembly may be reversed by mounting the MR fluid actuator unit 11 to the frame while applying a force on the door or gate or by mounting the MR fluid actuator unit 11 on the door or gate and applying the force on the frame.

In FIGS. 19 to 30, the MR fluid actuator unit 11 connected to door, gate or other devices may be used to create virtual mechanical functions. Only to name a few: check and detent, damping, spring, vibration generation may be generated the MR fluid actuator. The virtual mechanical functions generated by the MR fluid actuator unit 11 may be programmable and adaptable to various conditions. Information about conditions may be provided by sensors.

Figure 31:
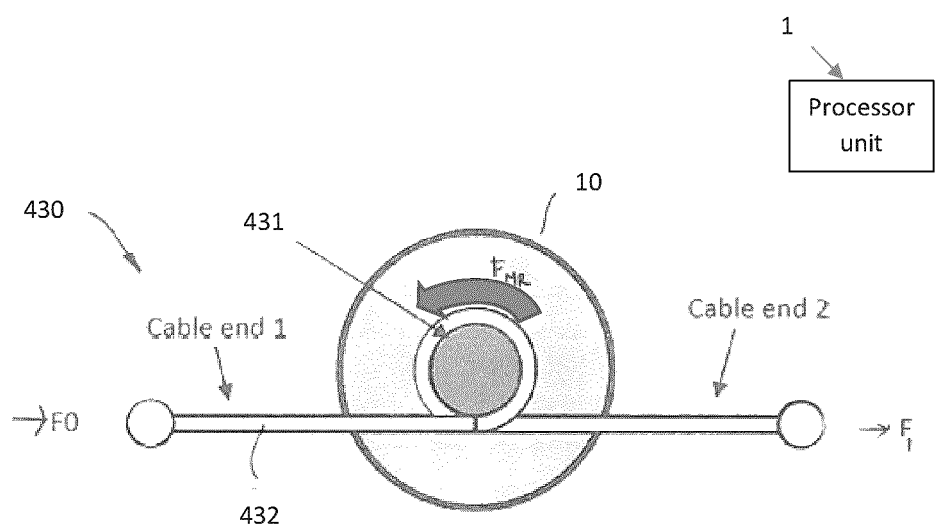
FIG. 31 is a schematic view of a MR fluid clutch cable tensioning system.

Referring to FIG. 31, there is illustrated a tensioning mechanism that may be used to maintain tension in a cable of the mechanisms of FIGS. 19 to 27, in which a cable is used. The tensioning mechanism 430 may also provide biasing force on the non active side of cable when necessary. The system 430 has an MR fluid clutch apparatus 10 connected to a capstan 431 so as to selectively transmit force from a power source (e.g., motor) to a mechanism, via cable 432 wound on the capstan 71 in a conventional fashion. Capstan 431 may also be replaced by a common pulley and cable 432 replaced by two cables, both cables attached to the common pulley 431. Biasing force $F_J$, for example a pulling action from a spring (not illustrated) or other biasing source produces an output force $F_O$ to displace a load. In some cases, the load may be the cable weight alone. In doing so, the friction between the cable 432 and the capstan 431 is such that the capstan 431 rotates as the cable 432 moves axially. The magnetorheological fluid clutch apparatus 10 may selectively transmit a rotation force $F_{MR}$ to assist in displacing the load, via the capstan 431. This type of tensioning device may present advantages in some devices that may be actuated when powered off or on devices in which the MR clutch apparatus 10 may only provide movement in one direction. For example, if the manually-actuated system 430 is used as part of a vehicle closing actuator and the actuator is forced to move by an outside force (e.g. a human) when the system is powered off, mechanism 430 may "reel" the cable to prevent a cable loosening situation on cable end 1. The above example is one among other examples in which a tensioning mechanism may be integrated in a human-hybrid powertrain and other tensioning mechanisms preventing cable loosening are considered. In addition, when only cable end 1 is present, a tensioning device (e.g., torsion spring only to name one) may be acting directly on the pulley 431 in order to prevent cable end 1 loosening. Moreover, as an alternative to the capstan 431, pulleys, racks and pinions, chain and sprockets, hydraulics, pneumatics, etc, could be used as well.

Figure 32:
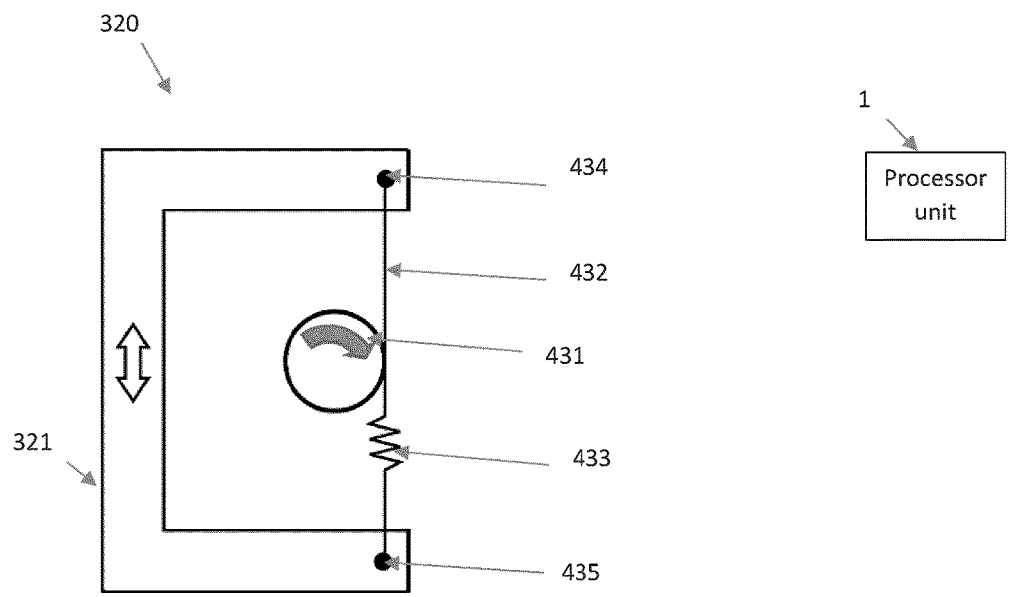
FIG. 32 is a schematic view of a mechanism similar to the mechanism of FIG. 31 but with reciprocal translational movement.

Referring to FIG. 32, there is illustrated a mechanism 320 similar to the one described in FIG. 31 with the difference that there is provided a reciprocal movement that prevents cable end 1 from loosening while limiting the required change of length of the tensioning element 433. With the proposed tensioning device, attach point 434 of the cable end 1 may travel a distance while attach point 435 of the cable end 2 travels a similar distance, limiting tensioning element 433 change of length. Member 321 may translate under a force generated by the MR clutch apparatus 10 (not illustrated) connected to the capstan or pulley 431. Manual actuation of the member 321 while mechanism 320 is powered off may happen while tension in cable 432 is maintained and cable 432 may not become loose. In some conditions, tensioning element 433 may be the elasticity of the cable 432 itself.

Figure 33:
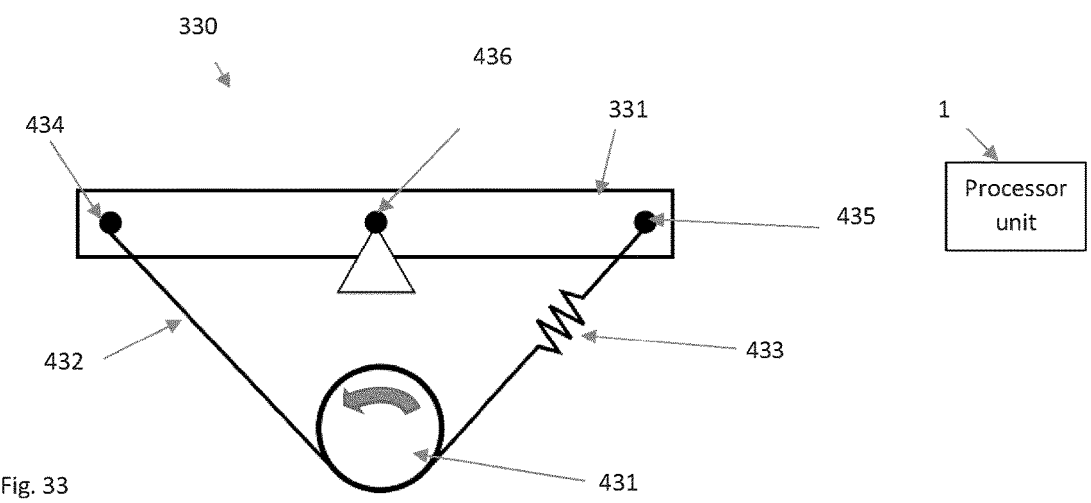
FIG. 33 is a schematic view of a mechanism similar to the mechanism of FIG. 32 but with a reciprocal rotational movement.

Referring to FIG. 33, there is illustrated a mechanism 330 similar to the one 320 described on FIG. 32 with the difference that the movement is not a translational movement, but a rotational movement of member 331 around a pivot 436. Member 331 may rotate under a force generated by the MR clutch apparatus 10 (not illustrated) connected to the capstan or pulley 431. An external force applied on member that generates a movement of member 331 may not, when the change of length of tensioning element 433 may cope with the change of length of cable 432, create a loosening cable of cable 432.

Numerous other equipment using human-hybrid powertrain may also be adapted to use the MR fluid actuator unit 11 as described herein. For instance, power steering in vehicles may be composed of a single power source connected to a speed reducer that drives two antagonistic MR fluid clutch apparatus to assist the driver. Due to the high bandwidth of this power steering system, enhanced features may be simulated to improve the situational awareness of the driver, such as variable spring gradient, steering wheel shaking, virtual wall, to name a few.

Exoskeletons dedicated to rehabilitation or performance enhancement (such as in military environment or handling) may also use such human hybrid powertrain. A single/multiple power source connected to single/multiple speed reducers that drive MR clutch apparatuses may assist the human manipulations according to predetermined degrees of freedom. The high bandwidth of the proposed actuation may make the human movements feel natural while achieving displacements that may require less force than it would with sole human energy.

In all embodiments, one mechanical arrangement or MR actuator configuration is shown but other MR fluid actuators are considered. At least one MR fluid clutch apparatuses should be connected to the motor A or connected to speed reducer B. Additional fluid clutch apparatuses may be connected to the motor A, to the speed reducer B, to the rotary-to-rotary or rotary-to-linear converter, or may be connected to any other part.

In the embodiments described above, the additional power source may work in concert with the human force in order to assure smooth movement, as the technology of MR fluid clutch apparatuses 10 has a bandwidth that is higher than the human body. The higher the bandwidth of the system that is in contact with the human, the more transparent to the human the system will be and the more natural it will feel. When there is an unpredictable human power source in the vehicle, the bandwidth of the internal combustion engine or the electrical motor powertrain needs to match the bandwidth of the human otherwise the controllability of the system may not be optimal. Also, the powertrain, when coupled with to a human effort, needs to be compliant in order to avoid being damaged and work well. A system in contact with the human body needs to be compliant not to expose the human body to unwanted forces or accelerations that could hurt the human or damage the powertrain.

In order to reach smoother movement control, that the embodiments described herein allow the impedance of the powertrain to actively match the impedance of the human body. With such new technology, control buttons may be removed and replaced by force or proximity sensors that would detect the human applied force and adjust the forces or direction of the powertrain in the desired direction. The equipment may then move in harmony with the human body.

What is claimed is:

1. A system for assisting a user in moving a door comprising:
    a magnetorheological (MR) fluid actuator unit including at least one torque source and at least one MR fluid clutch apparatus, the at least one MR fluid clutch apparatus having an input being rotatable and being coupled to the at least one torque source to receive torque from the at least one torque source, the MR fluid clutch apparatus controllable to transmit a variable amount of assistance force via an output of the at least one MR fluid clutch apparatus, the output being rotatable;
    an interface configured for coupling the output of the at least one MR fluid clutch apparatus to the door or surrounding structure;
    at least one sensor for providing information about the door; and
    a processor unit for controlling the at least one MR fluid clutch apparatus in exerting the variable amount of assistance force as a function of said information;
    wherein the system is configured for one of the MR fluid actuator unit and the interface to be coupled to a structure, and for the other of the MR fluid actuator unit and the interface to be coupled to the door for the assistance force from the MR fluid actuator unit to assist in moving the door.

2. The system according to claim 1, wherein the MR fluid actuator unit comprises a speed reduction device coupling the torque source with the MR fluid clutch apparatus.

3. The system according to claim 2, wherein the speed reduction device is a worm drive, with the input of the MR fluid clutch apparatus having a worm wheel of the worm drive.

4. The system according to claim 2, wherein the speed reduction device is a planetary gear device, with the input of the MR fluid clutch apparatus being connected to the output of the planetary gear device.

5. The system according to claim 1, wherein the interface includes a tensioning member spooled to a wheel at the output of the MR fluid clutch apparatus.

6. The system according to claim 5, wherein a free end of the tensioning member is configured to be coupled to the door for pulling the door during movement, and wherein the MR fluid actuator unit is configured to be secured to the structure.

7. The system according to claim 1, wherein the door is a gate, and wherein the MR fluid actuator unit is configured to provide the assistance force to raise the gate to a closed position.

8. The system according to claim 1, comprising two of the MR fluid clutch apparatus coupled to a single one of the torque source, the input of each of the MR fluid clutch apparatuses commonly connected to the single one of the torque source for allowing the MR fluid actuator unit to provide the assistance force bi-directionally onto the door.

9. The system according to claim 8, wherein the MR fluid actuator unit comprises a speed reduction device coupling the torque source with the two MR fluid clutch apparatuses.

10. The system according to claim 9, wherein the speed reduction device is a worm drive including a worm, with the inputs of the MR fluid clutch apparatuses each having a worm wheel meshed with the worm.

11. The system according to claim 8, wherein the interface includes a pair of tensioning members each spooled to a respective wheel at the output of each of the MR fluid clutch apparatuses.

12. The system according to claim 11, wherein the interface includes a lever, each of the tensioning members is connected to the lever configured to be coupled the door for converting the assistance force exerted by the MR fluid clutch apparatuses in opposite movements of the door, and wherein the MR fluid actuator unit is configured to be coupled to the structure.

13. The system according to claim 12, wherein the tensioning members are coupled to wheels on the lever.

14. The system according to claim 12, wherein the interface comprises a linkage between the lever and the door.

15. A vehicle comprising at least one door pivotally connected to a structure of the vehicle, and the system according to claim 1 for assisting a user in moving the door.

* * * * *